(12) United States Patent
White

(10) Patent No.: US 12,139,608 B2
(45) Date of Patent: Nov. 12, 2024

(54) NON-HALOGENATED FLAME RETARDANT POLYAMIDE COMPOSITIONS

(71) Applicant: Ascend Performance Materials Operations LLC, Houston, TX (US)

(72) Inventor: Kimberly M. White, Pensacola, FL (US)

(73) Assignee: Ascend Performance Materials Operations LLC, Houston, TX (US)

( * ) Notice: Subject to any disclaimer, the term of this patent is extended or adjusted under 35 U.S.C. 154(b) by 360 days.

(21) Appl. No.: 16/837,314

(22) Filed: Apr. 1, 2020

(65) Prior Publication Data

US 2020/0308402 A1   Oct. 1, 2020

Related U.S. Application Data

(60) Provisional application No. 62/827,653, filed on Apr. 1, 2019.

(51) Int. Cl.
| *C08L 77/00* | (2006.01) |
|---|---|
| *C08K 3/04* | (2006.01) |
| *C08K 3/38* | (2006.01) |
| *C08K 5/00* | (2006.01) |
| *C08K 5/49* | (2006.01) |
| *C08K 5/56* | (2006.01) |

(52) U.S. Cl.
CPC ............... *C08L 77/00* (2013.01); *C08K 3/04* (2013.01); *C08K 2003/387* (2013.01); *C08K 5/0066* (2013.01); *C08K 5/49* (2013.01); *C08K 5/56* (2013.01)

(58) Field of Classification Search
CPC ......... C08L 77/00; C08K 3/04; C08K 5/0066; C08K 5/49; C08K 5/56; C08K 2003/387
See application file for complete search history.

(56) References Cited

U.S. PATENT DOCUMENTS

| 4,760,129 A | 7/1988 | Haering et al. |
|---|---|---|
| 5,504,185 A | 4/1996 | Toki et al. |
| 5,543,495 A | 8/1996 | Anolick et al. |
| 5,698,658 A | 12/1997 | Dujari et al. |
| 6,011,134 A | 1/2000 | Marks et al. |
| 6,136,947 A | 10/2000 | Wiltzer et al. |
| 6,169,162 B1 | 1/2001 | Bush et al. |
| 7,138,482 B2 | 11/2006 | Tanaka et al. |
| 7,381,788 B2 | 6/2008 | Tsujii et al. |
| 8,234,296 B1 | 7/2012 | Black |
| 8,362,119 B2 | 1/2013 | Endtner et al. |
| 8,759,475 B2 | 6/2014 | Thierry et al. |
| 8,940,818 B2 | 1/2015 | Futterer et al. |
| 10,836,904 B2 | 11/2020 | Osborn et al. |
| 2007/0054992 A1 | 3/2007 | Urata et al. |
| 2007/0299171 A1 | 12/2007 | Couillens et al. |
| 2012/0029122 A1* | 2/2012 | Xue ........................ C08K 3/30 524/133 |
| 2013/0244527 A1 | 9/2013 | Sarzotti et al. |
| 2014/0171573 A1* | 6/2014 | Bayer ..................... C08K 3/014 524/400 |
| 2015/0183991 A1* | 7/2015 | Yamamoto ........... C08K 5/1539 524/133 |
| 2015/0218374 A1* | 8/2015 | Thomas ................... C08K 7/14 524/126 |
| 2015/0274968 A1* | 10/2015 | Bayer ..................... C08K 7/14 264/523 |
| 2016/0280914 A1* | 9/2016 | Thomas ............... C08G 69/265 |
| 2018/0072873 A1 | 3/2018 | Hoerold et al. |
| 2018/0171112 A1 | 6/2018 | Rakotomalala et al. |
| 2020/0216613 A1 | 7/2020 | White |

FOREIGN PATENT DOCUMENTS

| CN | 104130569 A | 11/2014 |
|---|---|---|
| DE | 19847626 | 4/2000 |
| EP | 2256167 | 12/2010 |
| EP | 2902444 | 8/2015 |
| JP | 2011012206 A | 1/2011 |
| JP | 2018065974 A | 4/2018 |
| WO | 2018075431 | 4/2018 |

OTHER PUBLICATIONS

"Kirk-Othmer", Encyclopedia of Chemical Technology, vol. 18, 3rd Edition,, 1982, pp. 328-371.
International Application No. PCT/US2020/026202, International Search Report and Written Opinion, Mailed on Jul. 30, 2020, 13 pages.
Snell et al., "Phenols to Sensory Testing Methods", Encyclopedia of Industrial Chemical Analysis, vol. 17, 1973, 33 pages.

* cited by examiner

*Primary Examiner* — Jane L Stanley
(74) *Attorney, Agent, or Firm* — COZEN O'CONNOR

(57) ABSTRACT

A non-halogenated flame retardant polyamide composition is disclosed which comprises a polyamide, a non-halogenated flame retardant, a PA-6 homopolymer, and at least one heat stabilizer comprising a copper-containing heat stabilizer, an amine-containing heat stabilizer, or a phenol-containing heat stabilizer. The polyamide may have a ratio of carboxylic acid to amine end groups of greater than 1.8:1. The polyamide composition may comprise less than 900 ppm of bromine. Products formed from the composition are also disclosed.

18 Claims, No Drawings

NON-HALOGENATED FLAME RETARDANT POLYAMIDE COMPOSITIONS

CROSS-REFERENCE TO RELATED APPLICATION

This application claims the benefit of and priority to U.S. Provisional Application No. 62/827,653 filed Apr. 1, 2019, which is incorporated herein by reference in its entirety.

TECHNICAL FIELD

The present disclosure relates to non-halogenated flame retardant polyamide compositions and molded products therefrom. More specifically, the present disclosure relates to non-halogenated flame retardant polyamide compositions comprising a synergistic combination of a polyamide with low reactivity, heat stabilizers, and optional additives, that produce polyamide compositions having excellent resistance to heat aging.

BACKGROUND

Polyamide resin compositions are known to have beneficial physical properties such as high melting points, high recrystallization temperatures, faster injection molding cycle times, high flow, toughness, elasticity, chemical resistance, inherent UL94 V2 flame retardancy, and abrasion resistance. These properties often make them ideal for high performance automotive and electrical/electronic applications. However, when plastic parts are exposed to high temperatures for a prolonged period, such as in automotive applications or in electrical/electronic applications, the mechanical properties generally tend to decrease due to the thermo-oxidation of the polymer. This phenomenon is often referred to as heat aging.

Polyamide resins that have good heat aging resistance are, obviously, useful in high temperature applications. Some examples of these applications are in the electrical/electronic industry where the trend toward integration of electronic components has led to an increasing need for plastic materials with much greater heat resistance and flame retardancy. Specific applications include connectors, circuit breakers, circuit boards and terminal blocks. These devices are often required to run continuously in demanding environments under extreme temperatures and voltages.

In an attempt to improve heat aging characteristics of polymers, it has been the conventional practice to add heat stabilizers to thermoplastic compositions comprising polyester or polyamide resins. However, the heat aging characteristics of existing technologies are insufficient for more demanding applications involving exposure to higher temperatures, e.g., automotive applications and in electrical/electronic applications. Additionally, while adding heat stabilizers to the polyamide resins may improve heat aging, heat stabilizers often introduce additional halogen compounds to the composition. Therefore, thermoplastic composition that use such heat stabilizers may not able to be rated as "non-halogen."

Therefore, a need exists for polyamide molding compositions that provide improved thermal aging stability along with durability, while maintaining a non-halogen rating.

SUMMARY

In some embodiments, the present disclosure is directed to a flame retardant polyamide composition comprising: a polyamide having a ratio of carboxylic acid end groups to amine end groups of greater than 1.8:1; a non-halogenated flame retardant; less than 0.29 wt. % of a first copper-containing heat stabilizer comprising a copper halide and an organohalo-phosphorus compound, based on the total weight of the polyamide composition; wherein the polyamide composition comprises less than 900 ppm of bromine, and wherein the polyamide composition retains 50% of its original tensile strength after heat aging for greater than 800 hours when heat aged at a temperature of 195° C. and measured at 23° C. In some embodiments, the polyamide composition further comprises a PA-6 homopolymer. In some embodiments, the PA-6 homopolymer is present up to 20 wt. %, based on the total weight of the polyamide composition. In some embodiments, the polyamide composition comprises less than 900 ppm of chlorine. In some embodiments, the polyamide composition comprises less than 1500 ppm of chlorine and bromine in combination. In some embodiments, polyamide composition further comprises a second copper-containing heat stabilizer comprising free copper; and a copper complexing agent comprising a phosphorus-containing additive. In some embodiments, the copper complexing agent complexes the free copper of the second copper-containing heat stabilizer. In some embodiments, the phosphorus-containing additive comprises a phosphine-containing compound, a phosphate-containing compound, a polyphosphate-containing compound, a bromine-containing phosphate, a bromine-containing polyphosphate, a bromine-containing phosphite, a chlorine-containing phosphate, a chlorine-containing polyphosphonate, a chlorine-containing phosphite, triphenylphosphine, triphenylphosphite or combinations thereof. In some embodiments, the second copper-containing heat stabilizer comprises copper halides, copper acetate, copper propionate, copper benzoate, copper adipate, copper terephthalate, copper isophthalate, copper salicylate, copper nicotinate, copper stearate, copper complex salts, or combinations thereof. In some embodiments, the second copper-containing heat stabilizer is present in an amount less than 3 wt. %, based on the total weight of the polyamide composition. In some embodiments, the polyamide composition further comprises an amine-containing heat stabilizer, a phenol-containing heat stabilizer, or combinations thereof. In some embodiments, the polyamide composition comprises less than 5 wt. % of elemental phosphorus, based on the total weight of the polyamide composition. In some embodiments, the polyamide composition comprises from 0.1 wt. % to 20 wt. % of PA6, wherein the polyamide composition has a tensile elongation of at least 1.0%, and wherein the polyamide composition has a tensile strength retention of at least 75% when heat aged for 1000 hours at a temperature of 155° C. and measured at 23° C. In some embodiments, the polyamide composition further comprises one or more additives comprising a flow modifier, fiberglass, a filler, a synergist, a lubricant/mold-release agent, antioxidants, or combinations thereof. In some embodiments, the polyamide composition comprises 40 wt. % to 70 wt. % of the polyamide; 5 wt. % to 25 wt. % of the non-halogen flame retardant; 0.1 wt. % to 3 wt. % of the second copper-containing heat stabilizer; 0.1 wt. % to 15 wt. % of copper complexing agent; and 0 wt. % to 10 wt. % of a lubricant/mold release agent. In some embodiments, the non-halogenated flame retardant comprises an organic phosphorus flame retardant. In some embodiments, the polyamide composition comprises 40 wt. % to 70 wt. % of the polyamide; 5 wt. % to 25 wt. % of the non-halogen flame retardant; 0 wt. % to 30 wt. % of fiberglass; 0 wt. % to 3 wt. % of carbon black; and 0 wt. % to 5 wt. % of zinc stearate and/or zinc borate.

In some embodiments, the present disclosure is directed to a flame retardant polyamide composition comprising: a polyamide having a ratio of carboxylic acid end groups to amine end groups of greater than 1.8:1; a non-halogenated flame retardant; a PA-6 homopolymer; less than 0.29 wt. % of a first copper-containing heat stabilizer comprising a copper halide and an organohalo-phosphorus compound, based on the total weight of the polyamide composition; and wherein the polyamide composition comprises less than 900 ppm of bromine.

In some embodiments, the present disclosure is directed to a flame retardant polyamide composition comprising: a polyamide having a ratio of carboxylic acid end groups to amine end groups of greater than 1.8:1; a non-halogenated flame retardant; a PA-6 homopolymer; and an amine-containing heat stabilizer, wherein the polyamide composition retains 50% of its original tensile strength after heat aging for greater than 450 hours when heat aged at a temperature of 215° C. and measured at 23° C. In some embodiments, the PA-6 homopolymer is present up to 20 wt. %, based on the total weight of the polyamide composition, and wherein the polyamide composition has a tensile elongation of at least 3.0%. In some embodiments, the amine-containing heat-stabilizer comprise hindered amine-based heat stabilizers. In some embodiments, the composition further comprises one or more additives comprising a flow modifier, fiberglass, a filler, a synergist, a lubricant/mold-release agent, antioxidants, or combinations thereof. In some embodiments, the non-halogenated flame retardant comprises an organic phosphorus flame retardant.

In some embodiments, the present disclosure is directed to a flame retardant polyamide composition comprising: a polyamide having a ratio of carboxylic acid end groups to amine end groups of greater than 1.8:1; a non-halogenated flame retardant; a PA-6 homopolymer; and a phenol-containing heat stabilizer. In some embodiments, the PA-6 homopolymer is present up to 20 wt. %, based on the total weight of the polyamide composition, wherein the polyamide composition retains 50% of its original tensile strength after heat aging for greater than 450 hours when heat aged at a temperature of 215° C. and measured at 23° C., and wherein the polyamide composition has a tensile elongation of at least 2.5%. In some embodiments, the phenol-containing heat stabilizer comprises N,N'-hexane-1,6-diylbis[3-(3,5-di-tert-butyl-4-hydroxyphenylpropionamide)]; pentaerythrityl-tetrakis[3-(3,5-di-tert-butyl-4-hydroxyphenyl)propionate]; N,N'-hexamethylenebis(3,5-di-tert-butyl-4-hydroxy-hydrocinnamamide); triethyleneglycol-bis[3-(3-tert-butyl-5-methyl-4-hydroxyphenyl)propionate]; 3,9-bis{2-[3-(3-tert-butyl-4-hydroxy-5-methylphenyl)propionyloxy]-1,1-dimethylethyl}-2,4,8,10-tetraoxaspiro[5,5]undecane; 3,5-di-tert-butyl-4-hydroxybenzylphosphonate-diethyl ester; 1,3,5-trimethyl-2,4,6-tris(3,5-di-tert-butyl-4-hydroxybenzyl)benzene; and 1,3,5-tris(4-tert-butyl-3-hydroxy-2,6-dimethylbenzyl)isocyanurate, or combinations thereof. In some embodiments, the polyamide composition further comprises one or more additives comprising a flow modifier, fiberglass, a filler, a synergist, a lubricant/mold-release agent, antioxidants, or combinations thereof. In some embodiments, the non-halogenated flame retardant comprises an organic phosphorus flame retardant.

In some embodiments, the present disclosure is directed to a molded flame retardant polyamide product according to any one of the polyamide compositions described herein.

DETAILED DESCRIPTION

Overview

Conventional polyamide compositions often include heat stabilizer packages that attempt to improve high temperature heat aging performance. Although the art is replete with examples of heat stabilized compositions, most, if not all, of these compositions fail to achieve the very high heat age performance that is required by prolonged high temperature applications such as automotive or electrical/electronic applications.

The present disclosure is directed to non-halogenated flame retardant polyamide compositions and molded products produced therefrom that demonstrate improvements in high heat age performance. The disclosed polyamide compositions utilize a unique combination of polyamides having a high ratio of carboxylic acid end groups to amine end groups, e.g., greater than 1.8:1, specific heat stabilizers and optional additives, e.g., PA-6 homopolymer. Generally, it is known that a polyamide comprising high carboxylic end groups would not provide high heat temperature performance. The use of these heat stabilizers in combination with a polyamide having a high ratio of carboxylic end groups to amine end groups surprisingly and unexpectedly provides for good heat age performance while maintaining non-halogen ratings. Surprisingly, the polyamide compositions described herein have synergies with other components (e.g., heat stabilizers, additives, etc.), which allows the compositions to achieve good heat age performance despite having high carboxylic end groups.

Some conventional copper-containing heat stabilizers may improve thermal aging stability properties, but may detrimentally compromise the non-halogen rating of a polyamide composition due to the halogen component content. For example, some copper-containing heat stabilizers comprise high amounts of a halogen compound, e.g., organohalo-phosphorus (organobromine-phosphorus) compound, which helps to improve heat aging properties, but detrimentally contributes to exceeding halogen content limits. Further, it has now been found that some copper-containing heat stabilizers introduce high amounts of free copper into the polyamide composition. This free copper detrimentally affects surface appearance of the molded product and promotes contact corrosion. As used herein, "free copper" refers to unbound elemental copper or copper ions.

The inventors have now discovered that utilizing particular copper-containing heat stabilizers (in particular amounts), and optionally with specific additives, results in synergistic heat stabilizer packages that provide for excellent heat aging properties and non-halogen ratings, and also minimize or eliminate the amount of free copper introduced into the polyamide composition. For example, in some embodiments, the content of a copper-containing heat stabilizer is limited to satisfy a non-halogen rating and also provides superior heat aging properties for the polyamide composition without adding free copper to the polyamide composition. The inventors have also found that the addition of particular copper complexing agent, e.g., phosphorus-containing compounds, complexes any free copper that may be present in the polyamide composition. In other cases, the use of additional copper-containing heat stabilizers that contain complexed copper, can also reduce the amount of free copper in the polyamide composition, which in turn reduces contact corrosion in the final polyamide composition. Further, the copper-containing heat stabilizer provides a polyamide composition having a high relative temperature index (RTI).

The inventors have also discovered that utilizing PA-6 homopolymer in the polyamide composition in combination with heat stabilizers (in particular amounts), and optionally with specific additives, results in synergistic heat stabilizer packages that provide for excellent heat aging properties and non-halogen ratings. For example, in some embodiments, the polyamide composition may include PA-6 homopolymer in combination with at least one of a copper-containing heat stabilizer, an amine-containing heat stabilizer, or a phenol-containing heat stabilizer. The PA-6 homopolymer has synergistic effects with the aforementioned heat stabilizers that provides a high RTI while satisfying a non-halogen rating.

Additionally, the inventors have found that by utilizing a particular polyamide having specific characteristics in particular a controlled ratio of carboxylic end groups to amine end groups, compositions having synergistic features are formed. Without being bound by theory, it is postulated that the use of a polyamide having lowered reactivity, increased inert acetic acid end groups, and/or increased carboxylic acid end groups, has resulted in the improved thermal stability and other desirable characteristics. As an additional benefit, the molecular weight of the composition, from initial formation to final compounding and molding, is controlled.

Also, the inventors have found that the disclosed compositions yield products with reduced plating out and corrosion of metal components. These improvements advantageously result in products with improved durability and performance. In some embodiments, the composition is prepared and then compounded and molded into a final molded product.

In some embodiments, the polyamide compositions comprise a polyamide, a non-halogenated flame retardant, a (first) copper-containing heat stabilizer, and optionally one or more additives. The polyamide may have a ratio of carboxylic acid end groups to amine end groups of greater than 1.8:1 (a "high CEG polyamide"). The polyamide composition may include (less than 0.29 wt. % of) the first copper-containing heat stabilizer, which may comprise a copper halide and an organohalo-phosphorus (organobromine-phosphorus) compound (a bound copper heat stabilizer).

In some embodiments, the polyamide compositions comprise a polyamide, a non-halogenated flame retardant, PA-6 homopolymer, first copper-containing heat stabilizer, and optionally one or more additives. The polyamide may be as disclosed herein. The polyamide composition may include (less than 0.29 wt. % of) the first copper-containing heat stabilizer comprising a copper halide and an organobromine-phosphorus compound.

In some embodiments, the polyamide compositions comprise a polyamide, a non-halogenated flame retardant, PA-6 homopolymer, amine-containing heat stabilizer, and optionally one or more additives. The polyamide may be as disclosed herein. The polyamide composition may include from about 0.1 wt. % to about 2 wt. % of amine-containing heat stabilizer.

In some embodiments, the polyamide compositions comprise a polyamide, a non-halogenated flame retardant, PA-6 homopolymer, phenol-containing heat stabilizer, and optionally one or more additives. The polyamide may be as disclosed herein. The polyamide composition may include from about 0.1 wt. % to about 2 wt. % of phenol-containing heat stabilizer.

In some cases, when the compositions further comprise a second copper-containing heat stabilizer that comprises free copper (a free copper heat stabilizer), the polyamide may further comprise a copper complexing agent. The copper complexing agent may comprise a phosphorus-containing compound that complexes the free copper present in the polyamide composition from the second copper-containing heat stabilizer. In some cases, the free copper of the second copper-containing heat stabilizer can be complexed by the copper complexing agent prior to adding the second copper-containing heat stabilizer to the polyamide composition. In other words, the second copper-containing heat stabilizer may be supplied to the polyamide composition with complexed copper. It has been found that the compositions described herein are thermally stable and have reduced molecular weight increase during compounding and molding.

Copper-Containing Heat-Stabilizers

The polyamide composition may comprise one or more heat stabilizers. In some embodiments, the one or more heat stabilizers comprise a (first) copper-containing heat stabilizer. In some embodiments, the first copper-containing heat stabilizer comprises copper, a halogen, (or a copper halide—a compound containing copper and a halogen), and optionally an organohalo-phosphorus (organobromine-phosphorus) compound. In some aspects, the first copper-containing heat stabilizer comprises a mixture including copper halides, phosphates, or phosphines, or complexes thereof. In some aspects, the first copper-containing heat stabilizer comprises a complex including copper iodide, bis(triphenylphosphine), and tris(tribromoneopentyl)phosphate. Suitable first copper-containing heat stabilizers include those described in German Patent No. DE19847626, which is incorporated by reference in its entirety.

These copper halide and organohalo-phosphorus (organobromine-phosphorus) compound combinations, when added to the polyamides described herein, result in polyamide compositions that exhibit superior heat stability while also maintaining excellent electrical properties, thus making the polyamide compositions of the present invention ideally suited for use in the electrical/electronic industries. As a further benefit, this combination of a copper halide and an organophosphorus compound does not discolor the polyamide composition.

Suitable commercial (first) copper-containing heat stabilizers include BRUGGOLEN® H3386 (available from Brüggemann Chemical).

As described above, a polyamide composition comprising a first copper-containing heat stabilizer including halogen compounds, e.g., organobromine-phosphorus compound, may have the potential to exceed the halogen content for a non-halogen rating. To avoid exceeding the halogen content limits, the polyamide composition may comprise the first copper-containing heat stabilizer in particular amounts.

In some embodiments, the polyamide composition comprises the first copper-containing heat stabilizer in an amount ranging from 0.01 wt. % to 0.29 wt. %, based on the total weight of the polyamide composition, e.g., from 0.05 wt. % to 0.28 wt. %, from 0.08 wt. % to 0.275 wt. %, from 0.1 wt. % to 0.27 wt. %, from 0.12 wt. % to 0.26 wt. %, from 0.14 wt. % to 0.25 wt. %, from 0.15 wt. % to 0.24 wt. %, from 0.16 wt. % to 0.23 wt. %, or from 0.17 wt. % to 0.22 wt. %. In terms of upper limits, the polyamide composition comprises the first copper-containing heat stabilizer in an amount less than 0.29 wt. %, based on the total weight of the polyamide composition, e.g., less than 0.28 wt. %, less than 0.27 wt. %, less than 0.26 wt. %, less than 0.25 wt. %, less than 0.24 wt. %, less than 0.23 wt. %, less than 0.22 wt. %, less than 0.21 wt. %, or less than 0.20 wt. %. In terms of lower limits, the polyamide composition comprises the first copper-containing heat stabilizer in an amount greater than 0.01 wt. %, based on the total weight of the polyamide composition, e.g., greater than 0.02 wt. %, greater than 0.04 wt. %, greater than 0.05 wt. %, greater than 0.06 wt. %, greater than 0.08 wt. %, greater than 0.1 wt. %, greater than 0.12 wt. %, greater than 0.14 wt. %, or greater than 0.15 wt. %. It was found that these specific quantities of the first copper-containing heat stabilizer provide good heat aging properties while also satisfying a non-halogen rating.

In some embodiments, the first copper heat stabilizer may comprise a copper-based compound in which the copper is bound to another compound (e.g., no free copper). In some embodiments, the first copper heat stabilizer comprises a copper halide and an organophosphorus compound, e.g., a copper halide complexed with an organophosphorus compound. For example, the organophosphorus compounds may include organophosphites such as triphenyl phosphite, tris-(2,6-dimethylphenyl)phosphite, tris-(mixed mono-and di-nonylphenyl)phosphite or the like; triphenyl phosphines, phosphonates such as dimethylbenzene phosphonate or the like, phosphates such as trimethyl phosphate, or combinations comprising at least one of the foregoing heat stabilizers. In some aspects, the first heat stabilizer is a copper halide complexed with triphenylphosphine or triphenylphosphite. In some aspects, the first copper heat stabilizer is copper iodide complexed with triphenylphosphine or triphenylphosphite.

In some aspects, the first copper-containing heat stabilizer comprises a copper halide and an organophosphorus compound. The organophosphorus compound may be triphenyl phosphine or triphenylphosphite. The organophosphorus compound and the copper halide may form a complex, e.g., copper(I) halide/bis (triphenylphosphine), copper(I) halide/bis (triphenylphosphite), copper(I) iodide/bis (triphenylphosphine), and/or copper(I) iodide/bis (triphenylphosphite).

In some aspects, the first copper-containing heat stabilizer comprises a copper halide and a chlorine-containing organophosphorus compound. The chlorine-containing organophosphorus compound may be a chlorine-containing phosphate and/or chlorine-containing polyphosphonate. The chlorine-containing organophosphorus compound and the copper halide may form a complex, e.g., copper(I) halide/bis (chlorine-containing phosphate), copper(I) halide/bis (chlorine-containing polyphosphonate), copper(I) iodide/bis (chlorine-containing phosphate), and/or copper(I) iodide/bis (chlorine-containing polyphosphonate).

In some embodiments, the polyamide composition may comprise a second heat stabilizer. In some embodiments, the second heat stabilizer is a (second) copper-containing heat stabilizer. The second copper-containing heat stabilizer may be added to the polyamide composition to supplement the first copper-containing heat stabilizer and/or to maintain the non-halogen rating. For example, in some embodiments, when the content of the first copper-containing heat stabilizer is limited to satisfy the non-halogen rating, the second copper-containing heat stabilizer may be added to provide good heat aging properties for the polyamide composition.

In some aspects, the second copper heat stabilizer may comprise a metal halide and an alkali metal salt. In some aspects, the metal halide may comprise copper in combination with a halogen (e.g., iodide or bromine). In some aspects, the metal halide may comprise potassium in combination with a halogen (e.g., iodide or bromine). In some aspects, the second copper heat stabilizer may comprise one or more of CuI, CuBr, KI, or KBr.

In some embodiments, the amount of the second copper-containing heat stabilizer present in the polyamide composition ranges from 0.01 wt. % to 3 wt. %, based on the total weight of the polyamide composition, e.g., 0.05 wt. % to 2.8 wt. %, 0.1 wt. % to 2.6 wt. %, 0.2 wt. % to 2.4 wt. %, 0.4 wt. % to 2.2 wt. %, 0.6 wt. % to 2.1 wt. %, 0.8 wt. % to 2 wt. %, 1 wt. % to 1.8 wt. %, or 1.2 wt. % to 1.6 wt. %. In terms of upper limits, the amount of the second copper-containing heat stabilizer present in the polyamide composition is less than 3 wt. %, based on the total weight of the polyamide composition, e.g., less than 2.9 wt. %, less than 2.8 wt. %, less than 2.6 wt. %, less than 2.2 wt. %, less than 2.1 wt. %, less than 2 wt. %, less than 1.8 wt. %, less than 1.6 wt. %, or less than 1.5 wt. %. In terms of lower limits, the amount of the second copper-containing heat stabilizer present in the polyamide composition is greater than 0.01 wt. %, based on the total weight of the polyamide composition, e.g., greater than 0.05 wt. %, greater than 0.1 wt. %, greater than 0.2 wt. %, greater than 0.4 wt. %, greater than 0.6 wt. %, greater than 0.8 wt. %, greater than 1 wt. %, greater than 1.2 wt. %, or greater than 1.4 wt. %.

In some embodiments, the second copper-containing heat stabilizer comprises (low amounts of) free copper, e.g., elemental copper or copper ions, that may bleed into the polyamide composition. As used herein, "free copper" refers to unbound elemental copper or copper ions. It was found the free copper may precipitate from the polyamide composition and cause discoloration thereby affecting the surface appearance of the molded article. Additionally, the free copper present in the polyamide composition may adversely affect other properties of the polyamide composition including, but not limited to, e.g., heat aging resistance of the molded article, dimensional accuracy, and chemical resistance. The reduction or elimination of free copper in the stabilizers or in the polyamide composition generally surprisingly provides for improvements in these properties.

In some embodiments, the amount of free copper, e.g., elemental copper or copper ions, present in the polyamide composition ranges from 100 ppm to 200 ppm, e.g., from 105 ppm to 290 ppm, from 110 ppm to 290 ppm, from 115 ppm to 185 ppm, from 120 ppm to 180 ppm, from 125 ppm to 175 ppm, from 130 ppm to 170 ppm, from 135 ppm to 165, from 140 ppm to 160 ppm, ppm, or from 145 ppm to 155 ppm. In terms of upper limits, the amount of free copper present in the polyamide composition is less than 200 ppm, e.g., less than 195 ppm, less than 190 ppm, less than 185 ppm, less than 180 ppm, less than 175 ppm, less than 170 ppm, or less than 165 ppm. In terms of lower limits, the amount of free copper present in the polyamide composition is greater than 100 ppm, e.g., greater than 105 ppm, greater than 110 ppm, greater than 115 ppm, greater than 120 ppm, greater than 125 ppm, greater than 130 ppm, greater than 135 ppm, or greater than 140 ppm.

It was found that the aforementioned quantities of free copper in a polyamide composition, e.g., less than 200 ppm, it is possible to suppress coloring due to precipitation. It is possible to further improve the surface appearance of the molded article. Further, reducing the amount of free copper suppresses the deterioration of the hydrogen bonding of the amide group due to excessive coordination bonds polyamide resin and copper, wear resistance of the molded article, fatigue resistance, heat aging resistance, improve the chemical resistance can. The content of free copper present in the polyamide resin composition may be within a desired range described above by adjusting the amount of copper compound as appropriate. Additionally, copper that is complexed or otherwise in a form that reduces and/or prevents migration of the copper, e.g., non-migratory copper, reduces contact corrosion of copper from the final product.

In some embodiments, a copper complexing agent, e.g., a phosphorus-containing compound, is added to the polyamide composition to complex the free copper of the second copper-containing heat stabilizer. In other words, the copper complexing agent complexes the free copper in the polyamide composition to reduce the amount of free copper ions in the polyamide composition. In some embodiments, the second copper-containing heat stabilizer may comprise complexed copper. In some aspects, the second copper-containing heat stabilizer may comprise copper complexed by phosphorus. In some aspects, the second copper-containing heat stabilizer is supplied to the polyamide composition with complexed copper such that no free copper is introduced into the polyamide composition.

In some embodiments, the second copper-containing heat stabilizer does not comprise any halogen-containing compounds. In some aspects, second copper-containing heat stabilizer does not comprise any bromine-containing compounds. In some aspects, second copper-containing heat stabilizer does not comprise any chlorine-containing compounds.

In some embodiments, the total amount of halogens in the polyamide composition supplied by the heat stabilizers is less than 1500 ppm to achieve a non-halogen rating. For example, the total amount of halogen compounds contributed by the first heat stabilizer and the second heat stabilizer is less than 1500 ppm. In some embodiments, the total amount of bromine in the polyamide composition contributed by the heat stabilizers is less than 900 ppm bromine. In some embodiments, the total amount of bromine in the polyamide composition contributed by the heat stabilizers ranges from 100 to 900 ppm, e.g., from 150 to 880 ppm, from 200 to 860 ppm, from 250 to 840 ppm, from 300 to 820 ppm, from 350 to 800 ppm, or from 400 to 780 ppm. In terms of upper limits, the total amount of bromine in the polyamide composition contributed from the heat stabilizers is less than 900 ppm, e.g., less than 880 ppm, less than 860 ppm, less than 840 ppm, less than 820 ppm, less than 800 ppm, less than 780 ppm, less than 760 ppm, or less than 740 ppm. In terms of lower limits, the total amount of bromine in the polyamide composition contributed by the heat stabilizers is greater than 100 ppm, e.g., greater than 150 ppm, greater than 200 ppm, greater than 250 ppm, greater than 300 ppm, greater than 350 ppm, greater than 400 ppm, greater than 450 ppm, or greater than 500 ppm.

In some embodiments, the total amount of chlorine in the polyamide composition contributed by the heat stabilizers is less than 900 ppm. In some embodiments, the total amount of chlorine in the polyamide composition contributed by the heat stabilizers ranges from 100 to 900 ppm, e.g., from 150 to 880 ppm, from 200 to 860 ppm, from 250 to 840 ppm, from 300 to 820 ppm, from 350 to 800 ppm, or from 400 to 780 ppm. In terms of upper limits, the total amount of chlorine in the polyamide composition contributed from the heat stabilizers is less than 900 ppm, e.g., less than 880 ppm, less than 860 ppm, less than 840 ppm, less than 820 ppm, less than 800 ppm, less than 780 ppm, less than 760 ppm, or less than 740 ppm. In terms of lower limits, the total amount of chlorine in the polyamide composition contributed by the heat stabilizers is greater than 100 ppm, e.g., greater than 150 ppm, greater than 200 ppm, greater than 250 ppm, greater than 300 ppm, greater than 350 ppm, greater than 400 ppm, greater than 450 ppm, or greater than 500 ppm.

In some embodiments, the total amount of bromine and chlorine in the polyamide composition contributed by the heat stabilizers is less than 1500 ppm bromine. In some embodiments, the total amount of bromine and chlorine in the polyamide composition contributed by the heat stabilizers ranges from 100 to 1500 ppm, e.g., from 150 to 1400 ppm, from 200 to 1300 ppm, from 250 to 1200 ppm, from 300 to 1100 ppm, from 400 to 1000 ppm, from 500 to 950 ppm, or from 600 to 900 ppm. In terms of upper limits, the total amount of bromine and chlorine in the polyamide composition contributed from the heat stabilizers is less than 1500 ppm, e.g., less than 1450 ppm, less than 1400 ppm, less than 1350 ppm, less than 1300 ppm, less than 1250 ppm, less than 1200 ppm, less than 1150 ppm, or less than 1100 ppm. In terms of lower limits, the total amount of bromine and chlorine in the polyamide composition contributed by the heat stabilizers is greater than 100 ppm, e.g., greater than 150 ppm, greater than 200 ppm, greater than 250 ppm, greater than 300 ppm, greater than 350 ppm, greater than 400 ppm, greater than 450 ppm, or greater than 500 ppm.

In an exemplary embodiment, the total maximum halogen (elemental fluorine, chlorine and bromine) content in a polyamide composition is 1500 ppm or less and is determined using UL Halogen test 746H.

Amine-Containing Heat Stabilizers

In some embodiments, the polyamide composition may comprise an amine-containing heat stabilizer. In some embodiments, the amine-containing heat stabilizer comprises an aromatic amine, a hindered amine, or combinations thereof. In some embodiments, the amine-containing heat stabilizer comprises bis(4-(1-methyl-1-phenylethyl)phenyl) amine, 2-ethyl-2'-ethoy-oxal anilide, imethyl glyoxime, 2,2'-bipyridine, 1,10-phenanthroline, ortho-phenylenediamine, 1,2-diaminocyclohexane, 1,4-diamino butane, urea, 8-hydroxyquinoline, substituted urea, and combinations thereof.

Suitable commercial amine-containing heat stabilizers include NYLOSTAB S-EED from Clariant, NAUGARD 445 from Addivant, OKABEST FLEX, OKABEST ULTRA-FLEX, OKABEST S-FLEX, OKABEST S-FLEX 2, OKABEST S-FLEX 3, OKAFLEX U, and OKAFLEX EM from OKA-Tec, or combinations thereof.

In some embodiments, the polyamide composition comprises the amine-containing heat stabilizer in an amount ranging from 0.1 wt. % to 2 wt. %, based on the total weight of the polyamide composition, e.g., from 0.2 wt. % to 1.8 wt. %, from 0.3 wt. % to 1.7 wt. %, from 0.4 wt. % to 1.6 wt. %, from 0.5 wt. % to 1.5 wt. %, from 0.6 wt. % to 1.4 wt. %, from 0.7 wt. % to 1.3 wt. %, from 0.8 wt. % to 1.2 wt. %, or from 0.9 wt. % to 1.1 wt. %. In terms of upper limits, the polyamide composition comprises the amine-containing heat stabilizer in an amount less than 2 wt. %, e.g., less than 1.9 wt. %, less than 1.8 wt. %, less than 1.6 wt. %, less than 1.4 wt. %, less than 1.2 wt. %, or less than 1.1 wt. %. In terms of lower limits, the polyamide composition comprises the amine-containing heat stabilizer in an amount greater than 0.1 wt. %, based on the total weight of the polyamide composition, e.g., greater than 0.2 wt. %, greater than 0.3 wt. %, greater than 0.4 wt. %, greater than 0.5 wt. %, greater than 0.6 wt. %, greater than 0.7 wt. %, greater than 0.8 wt. %, or greater than 0.9 wt. %. It was found that these specific quantities of the amine-containing heat stabilizer provide good heat aging properties while also satisfying a non-halogen rating.

Phenol-Containing Heat Stabilizers

In some embodiments, the polyamide composition may comprise a phenol-containing heat stabilizer. In some embodiments, the phenol-containing heat stabilizer comprises N,N'-hexane-1,6-diylbis[3-(3,5-di-tert-butyl-4-hydroxyphenylpropionamide)]; pentaerythrityl-tetrakis[3-(3,5- di-tert-butyl-4-hydroxyphenyl)propionate]; N,N'-hexamethylenebis(3,5-di-tert-butyl-4-hydroxyhydrocinnamamide); triethyleneglycol-bis[3-(3-tert-butyl-5-methyl-4-hydroxyphenyl)propionate]; 3,9-bis{2-[3-(3-tert-butyl-4-hydroxy-5-methylphenyl)propionyloxy]-1,1-dimethylethyl}-2,4,8,10-tetraoxaspiro[5,5]undecane; 3,5-di-tert-butyl-4-hydroxybenzylphosphonate-diethyl ester; 1,3,5-trimethyl-2,4,6-tris(3,5-di-tert-butyl-4-hydroxybenzyl)benzene; bis (2,4-dicumylphenyl) pentaerythritol diphosphite plus 1% triisopropanol amine, tetrakis (methylene (3,5-di-(tert)-butyl-4-hydroxyhydrocinnamate)) methane, N,N'-hexamethylene bis (3,5-di-(tert)butyl-hydroxyhydro-cinnamamide), bis(2,4-dicumylphenyl) pentaerythritol diphosphite plus stabilizer, and 1,3,5-tris(4-tert-butyl-3-hydroxy-2,6-dimethylbenzyl)isocyanurate, or combinations thereof.

Suitable commercial phenol-containing heat stabilizers include IRGANOX 1010, IRGANOX 1098, and IRGANOX 1076, from CIBA Specialty Chemicals, IRGAFOS 168 from CIBA Specialty Chemicals, DOVERPHOS S-9228T from Dover Chemical Corporation, or combinations thereof.

In some embodiments, the polyamide composition comprises the phenol-containing heat stabilizer in an amount ranging from 0.1 wt. % to 2 wt. %, based on the total weight of the polyamide composition, e.g., from 0.2 wt. % to 1.8 wt. %, from 0.3 wt. % to 1.7 wt. %, from 0.4 wt. % to 1.6 wt. %, from 0.5 wt. % to 1.5 wt. %, from 0.6 wt. % to 1.4 wt. %, from 0.7 wt. % to 1.3 wt. %, from 0.8 wt. % to 1.2 wt. %, or from 0.9 wt. % to 1.1 wt. %. In terms of upper limits, the polyamide composition comprises the phenol-containing heat stabilizer in an amount less than 2 wt. %, e.g., less than 1.9 wt. %, less than 1.8 wt. %, less than 1.6 wt. %, less than 1.4 wt. %, less than 1.2 wt. %, or less than 1.1 wt. %. In terms of lower limits, the polyamide composition comprises the phenol-containing heat stabilizer in an amount greater than 0.1 wt. %, based on the total weight of the polyamide composition, e.g., greater than 0.1 wt. %, greater than 0.2 wt. %, greater than 0.3 wt. %, greater than 0.4 wt. %, greater than 0.5 wt. %, greater than 0.6 wt. %, greater than 0.7 wt. %, greater than 0.8 wt. %, or greater than 0.9 wt. %. It was found that these specific quantities of the phenol-containing heat stabilizer provide good heat aging properties while also satisfying a non-halogen rating.

Phosphite-Containing Heat Stabilizers

In some embodiments, the polyamide composition may comprise a phosphite-containing heat stabilizer. In some embodiments, the phosphite-containing heat stabilizer may comprise alkali phosphites. In some embodiments, the phosphite-containing heat stabilizer may comprise manganese phosphite, sodium phosphite, sodium hydrogenphosphite, potassium phosphite, aluminum phosphite, calcium phosphite, magnesium phosphite, or combinations thereof. In some embodiments, the phosphite-containing heat stabilizer may comprise alkali-aluminum phosphites. Suitable commercial phosphite-containing heat stabilizers include BRUGGOLEN® H10 (available from Brüggemann Chemical).

In some embodiments, the polyamide composition comprises the phosphite-containing heat stabilizer in an amount ranging from 1 wt. % to 5 wt. %, based on the total weight of the polyamide composition, e.g., from 1.5 wt. % to 4.8 wt. %, from 1.8 wt. % to 4.6 wt. %, from 2 wt. % to 4.4 wt. %, from 2.5 wt. % to 4.2 wt. %, or from 3 wt. % to 4 wt. %. In terms of upper limits, the polyamide composition comprises the phosphite-containing heat stabilizer in an amount less than 5 wt. %, e.g., less than 4.8 wt. %, less than 4.6 wt. %, less than 4.4 wt. %, less than 4.2 wt. %, or less than 4 wt. %. In terms of lower limits, the polyamide composition comprises the phosphite-containing heat stabilizer in an amount greater than 1 wt. %, based on the total weight of the polyamide composition, e.g., greater than 1.5 wt. %, greater than 1.8 wt. %, greater than 2 wt. %, greater than 2.4 wt. %, greater than 2.6 wt. %, greater than 2.8 wt. %, or greater than 3 wt. %.

Copper Complexing Agent

The copper complexing agent used in the composition described herein may vary widely. In some embodiments, the copper complexing agent can be added to the polyamide composition to stabilize the free copper. For example, as noted above, the copper complexing agent may be a phosphorus-containing compound that complexes the free copper in the polyamide composition to reduce the amount of free copper. In some cases, any free copper present in the heat stabilizer can be complexed by the copper complexing agent prior to adding the heat stabilizer to the polyamide composition.

In some aspects, the copper complexing agent is a phosphate, such as a polyphosphate. Exemplary copper complexing agent include phosphinate, aluminum diethyl-phosphinate, and melamine polyphosphate. Further examples include condensation products of melamine and/or reaction products of melamine with polyphosphoric acid and/or reaction products of condensation products of melamine with polyphosphoric acid, or mixtures thereof; or comprises melem, melam, melon, dimelamine pyrophosphate, melamine polyphosphate, melem polyphosphate, melam polyphosphate, melon polyphosphate and/or mixed polysalts thereof; or comprises nitrogen-containing phosphates of the formulae $(HH_4)_y H_{3-y} PO_4$ and/or $(NH_4PO_3)_z$, where y is 1 to 3 and z is 1 to 10000. Yet further examples include mixed alkali-aluminum phosphites and mixtures thereof with alkali metal salts.

In some aspects, the copper complexing agent may be a chlorine-containing phosphate, a chlorine-containing polyphosphonate, or a chlorine-containing organophosphorus.

In some aspects, the copper complexing agent may be a non-phosphorus containing complexing agent. An exemplary additional copper complexing agent includes a phosphorus-free, non-corrosive silicone powder sold by Dow Corning® as 43-821. Additional copper complexing agents include zinc borate, calcium hypophosphite, aluminum hydrogenphosphites in combination with aluminum salts.

In terms of lower limits, the composition may include a copper complexing agent in an amount of at least 0.1 wt. %, e.g., at least 0.5 wt. %, at least 1 wt. %, at least 2 wt. %, at least 3 wt. %, or at least 4 wt. %. In terms of upper limits, the composition may include a copper complexing agent in an amount of 15 wt. % or less, 14 wt. % or less, 13 wt. % or less, 12 wt. % or less, 11 wt. % or less, or 10 wt. % or less. In terms of ranges, the composition may include a copper complexing agent in an amount from 0.1 to 15 wt. %, e.g., from 0.5 to 14 wt. %, from 1 to 13 wt. %, from 2 to 12 wt. %, from 3 to 11 wt. %, or from 4 to 10 wt. %.

Non-Halogenated Flame Retardant

Generally, non-halogenated flame retardants are used due to a desire to avoid the potentially adverse environmental impact of halogenated flame retardants.

Exemplary non-halogenated flame retardants include phosphorus- or melamine-containing flame retardants. Melamine flame retardants are known in the art and include melamine phosphates and melamine cyanurate. Phosphate esters are especially suitable for use. Such compounds include, for example, alkyl and aryl esters of phosphoric acid such as trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, di-iso-propylphenyl phosphate, trixylenyl phosphate, tris (iso-propylphenyl) phosphate, trinaphthyl phosphate, bisphenol A diphenyl phosphate, and resorcinol diphenyl phosphate. Commonly used triaryl phosphates include, for example, triphenyl phosphate (TPP), cresyl diphenyl phosphate, and tricresyl phosphate. Inorganic phosphate flame retardants such as ammonium polyphosphate (which acts as an intumescent flame retardant) may also be utilized.

Phosphinate flame retardants, including those sold by Exolit® as OP1230 and OP1400 may be used in the composition described herein. Phosphinate flame retardants may be desirable because of their anti-corrosive nature.

In terms of lower limits, the non-halogenated flame retardant is present in an amount of at least 5 wt. %, based on the total weight of the composition, e.g., at least 7.5 wt. %, at least 10 wt. %, or at least 12.5 wt. %. In terms of upper limits, the non-halogenated flame retardant is present in an amount of less than 25 wt. %, e.g., less than 22.5 wt. %, less than 20 wt. %, or less than 17.5 wt. %. In terms of ranges, the non-halogenated flame retardant is present from 5 to 25 wt. %, e.g., from 7.5 to 22.5 wt. %, from 10 to 20 wt. %, or from 12.5 to 17.5 wt. %.

In some embodiments, the non-halogenated flame retardants may serve as both a flame retardant and a complexing agent. For example, for heat stabilizers that are added to the polyamide composition with unbound components (e.g., copper), small amounts of the non-halogenated flame retardant can complex a portion of the heat stabilizer.

Polyamide

The polyamide may vary widely, and additional discussion and examples of suitable polyamides is provided herein. As discussed above, in some embodiments, the polyamide has high carboxylic end group content. It is believed that the high CEG polyamides work well with the aforementioned heat stabilizers because the use of a polyamide having lowered reactivity, e.g., through lower amine end groups, increased inert acetic acid end groups, and/or increased carboxylic acid end groups, have resulted in the improved thermal stability and other desirable characteristics. As an additional benefit, the molecular weight of the composition, from initial formation to final compounding and molding, is controlled.

Surprisingly and unexpectedly, it has been found that by controlling the ratio of carboxylic acid end groups to amine end groups in the polyamide resin, increases in weight average molecular weight, number average molecular weight, z-average molecular weight, polydispersity index, and intrinsic viscosity are minimized from the polyamide resin to the final product, through the compounding process. These improvements also provide for synergistic improvements in mechanical performance, especially at high temperatures.

In some aspects, the ratio of carboxylic acid end groups to amine end groups in the polyamide resin is greater than 1.8:1, e.g., greater than 1.9:1, greater than 2:1, greater than 2.1:1, greater than 2.2:1, greater than 2.3:1, or greater than 2.4:1. In terms of upper limits, the ratio of carboxylic acid end groups to amine end groups in the polyamide resin is 3:1 or less, e.g., 2.975:1 or less, 2.95:1 or less, 2.925:1 or less, 2.9:1 or less, 2.875:1 or less, 2.85:1 or less, 2.825:1 or less, 2.8:1 or less, 2.775:1 or less, 2.75:1, 2.725:1 or less, or 2.7:1 or less. In terms of ranges, the ratio of carboxylic acid end groups to amine end groups in the polyamide resin may be from 1.81:1 to 3:1, e.g., from 1.9:1 to 3:1, from 2:1 to 3:1, from 2.1:1 to 2.975:1, from 2:1 to 2.95:1, from 2.2:1 to 2.925:1, from 2.3:1 to 2.9:1, or from 2.4:1 to 2.7:1, including all ranges and values in between.

In some aspects, the carboxylic acid end groups are present in an amount less than 175 µeq/gram polyamide, e.g., less than 170 µeq/gram, less than 160 µeq/gram, or less than 150 µeq/gram. In terms of lower limits, the carboxylic acid end groups are present in an amount of at least 80 µeq/gram, e.g., at least 85 µeq/gram, at least 90 µeq/gram, or at least 95 µeq/gram. In terms of ranges, the carboxylic acid end groups may be present in an amount from 80 to 175 µeq/gram, e.g., from 85 to 160 µeq/gram, from 90 to 140 µeq/gram, or from 95 to 120 µeq/gram.

In some aspects, the amine end groups are present in an amount of less than 50 µeq/gram polyamide, e.g., less than 47 µeq/gram, less than 45 µeq/gram, or less than 43 µeq/gram. In terms of lower limits, the amine end groups are present in an amount of at least 5 µeq/gram, e.g., at least 10 µeq/gram, at least 15 µeq/gram, or at least 20 µeq/gram. In terms of ranges, the amine end groups may be present in an amount from 5 to 50 µeq/gram, e.g., from 10 to 47 µeq/gram, from 15 to 45 µeq/gram, or from 20 to 43 µeq/gram.

As used herein, delta end groups (DEG or DEGs) are defined as the quantity of amine ends ($-NH_2$) less the quantity of carboxylic acid ends (—COOH). DEG calculation methods are well known.

As noted above, the base polyamide composition utilizes particular ranges and/or limits of DEG levels. In some embodiments, the base polyamide composition has a DEG level ranging from −31 µeq/gram to −90 µeq/gram, e.g., from −35 µeq/gram to −85 µeq/gram, from −35 µeq/gram to −80 µeq/gram, from −40 µeq/gram to −75 µeq/gram, from −50 µeq/gram to −75 µeq/gram, from −40 µeq/gram to −70 µeq/gram, from −42 µeq/gram to −68 µeq/gram, from −45 µeq/gram to −60 µeq/gram, from −45 µeq/gram to −65 µeq/gram, from −47 µeq/gram to −63 µeq/gram, from −48 µeq/gram to −58 µeq/gram, −50 µeq/gram to −60 µeq/gram, or from −52 µeq/gram to −57 µeq/gram. In terms of lower limits, the base polyamide composition may have a DEG level greater than −85 µeq/gram, e.g. greater than −80 µeq/gram, greater than −75 µeq/gram, greater than −70 µeq/gram, greater than −68 µeq/gram, greater than −65 µeq/gram, greater than −63 µeq/gram, greater than −60 µeq/gram, greater than −58 µeq/gram, greater than −55 µeq/gram, greater than −53 µeq/gram, or greater than −50 µeq/gram. In terms of upper limits, the base polyamide composition may have a DEG level less than −30 µeq/gram, e.g., less than −35 µeq/gram, less than −40 µeq/gram, less than −42 µeq/gram, less than −45 µeq/gram, less than −48 µeq/gram, less than −50 µeq/gram, or less than −52 µeq/gram. These specific DEG levels have also been found to provide for the unexpected combination of advantageous, synergistic properties in the final product, following compounding, as described herein.

The polyamide end groups may be controlled in order to achieve the desired properties. Nylon 66, for example, contains amino end groups and acid end groups. The acid end groups include inert acetic acid end groups and reactive carboxylic acid end groups. Obtaining a polyamide unbalanced PA-6,6 can be achieved in various ways known to those skilled in the art, such as for example during polymerization depending on the stoichiometric imbalance of diamine compounds and diacids, or during extrusion by addition of compounds to obtain a polyamide 66 unbalanced final amine.

In some cases, end group levels (and the resultant DEG level) may be obtained/achieved/controlled by controlling the amount of excess hexamethylene diamine (HMD) in the polymerization reaction mixture. HMD is believed to be more volatile than the (di)carboxylic acids that are employed in the reaction, e.g. adipic acid. The HMD and the carboxylic acids act to balance the formula (based on the theoretical values for the end groups), and the balance between the two (and hence the DEG) can be adjusted to achieve desired properties in the polyamide compositions.

In some cases, end group levels (and the resultant DEG level) may be obtained/achieved/controlled via the incorporation of (mono) acids and/or (mono) amines, e.g., by "capping" some of the end structures to arrive at the desired DEG level, e.g., the desired end group balance.

In some cases, the utilization of monofunctional end capping has been found to provide the surprising benefit of controlling, e.g., slowing, the rate of polymerization in the SSP process. Without being bound by theory, it is believed that the capping (1) limits the amount of reactive ends; and (2) limits the degree of polymerization to a finite number. In some cases, the more end capping that is employed, the lower the (maximum) molecular weight can be (at 100% conversion). Both the former and latter may be achieved by creating high DEG systems. The monofunctional addition will increase DEG level.

In one embodiment, the (mono) acids and/or (mono) amines are incorporated at levels ranging from 1 and 40 µeq/gram, e.g., from 1 µeq/gram to 35 µeq/gram, from 3 µeq/gram to 35 µeq/gram, from 3 µeq/gram to 30 µeq/gram, from 5 µeq/gram to 30 µeq/gram, from 5 µeq/gram to 25 µeq/gram, from 7 µeq/gram to 25 µeq/gram, from 7 µeq/gram to 20 µeq/gram, from 10 µeq/gram to 20 µeq/gram, or from 10 µeq/gram to 15 µeq/gram. In terms of upper limits, the (mono) acids and/or (mono) amines may be incorporated at levels less than 40 µeq/gram, e.g., less than 35 µeq/gram, less than 30 µeq/gram, less than 25 µeq/gram, less than 20 µeq/gram, or less than 15 µeq/gram. In terms of lower limits, the (mono) acids and/or (mono) amines may be incorporated at levels greater than 1 µeq/gram, e.g., greater than 3 µeq/gram, greater than 5 µeq/gram, greater than 7 µeq/gram, or greater than 10 µeq/gram.

Exemplary (mono) acids include but are not limited to acetic acid, proprionic acid, butyric acid, valeric acid, hexanoic acid, octanoic acid, palmitic acid, myristic acid, decanoic acid, undecanoic acid, dodecanoic acid, oleic acid, or stearic acid, or any combinations thereof. Exemplary (mono) amines include but are not limited to benzylamine, ethylamine, propylamine, butylamine, pentylamine, hexylamine, 2-ethyl-1-hexylamine, heptylamine, octylamine, nonylamine, decylamine, undecylamine, dodecylamine, amylamine, tert-butyl amine, tetradecylamine, hexadecylamine, or octadecylamine, or any combinations thereof.

The amounts of amino end groups and/or acid are determined by potentiometric assays after dissolution of the polyamide. A method is described for example in "Encyclopedia of Industrial Chemical Analysis", Volume 17, page 293, 1973. The amounts of amine end groups (GTA) and/or acid (BMS) can be determined by potentiometric titration after complete dissolution of the polyamide in trifluoroethanol, and addition of a strong base in excess. The basic species are then titrated with an aqueous solution of strong acid. The amount of chain limiter is calculated by the ratio between the molar amount of added chain limiter and the mass of product polymer. The amount of chain limiter can also be determined by hydrolyzing the polyamide followed by analysis by liquid chromatography.

In some embodiments, the polyamides include nylon 66, as well as copolymers, blends, and alloys of nylon 66 with nylon 6. Other embodiments include nylon derivatives, copolymers, terpolymers, blends and alloys containing or prepared from nylon 66 or nylon 6, copolymers or terpolymers with the repeat units noted above including but not limited to: N6T/66, N612, N6/66, N6I/66, N11, and N12, wherein "N" means Nylon. Another preferred embodiment includes High Temperature Nylons ("HTN") as well as blends, derivatives, copolymers or terpolymers containing them. Furthermore, another preferred embodiment includes long chain aliphatic polyamide made with long chain diacids as well as blends, derivatives or copolymers containing them.

As used herein, polyamide composition and like terminology refers to compositions containing polyamides including copolymers, terpolymers, polymer blends, alloys and derivatives of polyamides. Further, as used herein, a "polyamide" refers to a polymer, having as a component, a polymer with the linkage of an amino group of one molecule and a carboxylic acid group of another molecule. In some aspects, the polyamide is the component present in the greatest amount. For example, a polyamide containing 40 wt. % nylon 6, 30 wt. % polyethylene, and 30 wt. % polypropylene is referred to herein as a polyamide since the nylon 6 component is present in the greatest amount. Additionally, a polyamide containing 20 wt. % nylon 6, 20 wt. % nylon 66, 30 wt. % polyethylene, and 30 wt. % polypropylene is also referred to herein as a polyamide since the nylon 6 and nylon 66 components, in total are the components present in the greatest amount.

Exemplary polyamides and polyamide compositions are described in Kirk-Othmer, Encyclopedia of Chemical Technology, Vol. 18, pp. 328371 (Wiley 1982), the disclosure of which is incorporated by reference.

Briefly, polyamides are generally known as compounds that contain recurring amide groups as integral parts of the main polymer chains. Linear polyamides are of particular interest and may be formed from condensation of bifunctional monomers. Polyamides are frequently referred to as nylons. Although they generally are considered as condensation polymers, polyamides also are formed by addition polymerization. This method of preparation is especially important for some polymers in which the monomers are cyclic lactams, e.g., Nylon 6. Particular polymers and copolymers and their preparation are seen in the following patents: U.S. Pat. Nos. 4,760,129; 5,504,185; 5,543,495; 5,698,658; 6,011,134; 6,136,947; 6,169,162; 7,138,482; 7,381,788; and 8,759,475.

There are numerous advantages of using polyamides, specifically nylons, in commercial applications. Nylons are generally chemical and temperature resistant, resulting in superior performance to other particles. They are also known to have improved strength, elongation, and abrasion resistance as compared to other polymers. Nylons are also very versatile, allowing for their use in a variety of applications.

A class of polyamides particularly preferred for some applications includes High Temperature Nylons (HTN's) as are described in Glasscock et al., High Performance Polyamides Fulfill Demanding Requirements for Automotive Thermal Management Components, (DuPont), http://www2.dupont.com/Automotive/en_US/assets/downloads/knowledge%20center/HTN-whitepaper-R8.pdf available online Jun. 10, 2016. Such polyamides typically include one or more of the structures seen in the following:

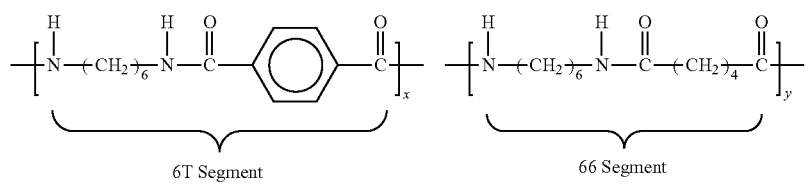

6T/66

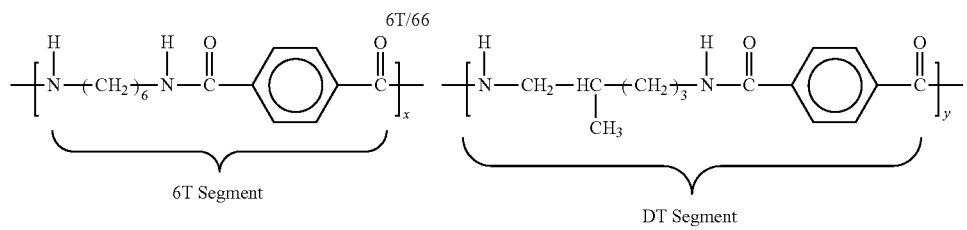

6T/DT

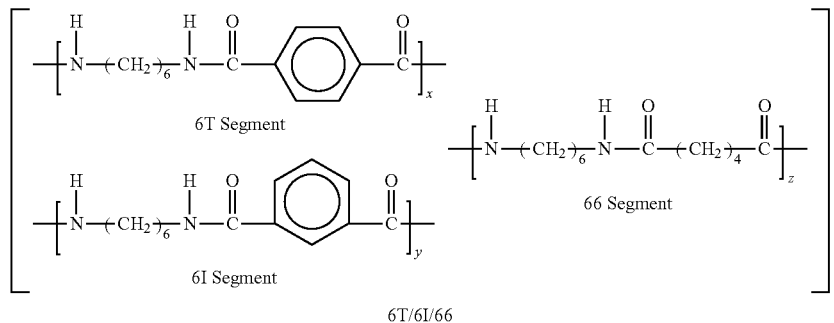

6T/6I/66

Non-limiting examples of polymers included in the polyamides include polyamides, polypropylene and copolymers, polyethylene and copolymers, polyesters, polystyrenes, polyurethanes, and combinations thereof.

Melt points of nylon nanofiber products described herein, including copolymers and terpolymers, may be between 223° C. and 390° C., e.g., from 223 to 380, or from 225° C. to 350° C. Additionally, the melt point may be greater than that of conventional nylon 66 melt points depending on any additional polymer materials that are added.

Other polymer materials that can be used in the compositions of the disclosure include both addition polymer and condensation polymer materials such as polyolefin, polyacetal, polyamide (as previously discussed), polyester, cellulose ether and ester, polyalkylene sulfide, polyarylene oxide, polysulfone, modified polysulfone polymers and mixtures thereof. Preferred materials that fall within these generic classes include polyamides, polyethylene, polybutylene terephthalate (PBT), polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. Nylon copolymers embodied herein, can be made by combining various diamine compounds, various diacid compounds and various cyclic lactam structures in a reaction mixture and then forming the nylon with randomly positioned monomeric materials in a polyamide structure. For example, a nylon 66-6,10 material is a nylon manufactured from hexamethylene diamine and a C6 and a C10 blend of diacids. A nylon 6-66-6,10 is a nylon manufactured by copolymerization of epsilonaminocaproic acid, hexamethylene diamine and a blend of a C6 and a C10 diacid material.

In some aspects, polyethylene may be used in the composition of the disclosure. The polyethylene useful in the process of this embodiment of the subject disclosure preferably may have a melt index between about 5 grams/10 min and about 200 grams/10 min and, e.g., between about 17 grams/10 min and about 150 grams/10 min. The polyethylene should preferably have a density between about 0.85 grams/cc and about 1.1 grams/cc and, e.g., between about 0.93 grams/cc and about 0.95 grams/cc. Most preferably, the melt index of the polyethylene is about 150 and the density is about 0.93.

The blend or copolymer of polyethylene and nylon can be formed in any suitable manner. Typically, the nylon compound will be nylon 66; however, other polyamides of the nylon family can be used. Also, mixtures of nylons can be used. In one specific example, polyethylene is blended with a mixture of nylon 6 and nylon 66. The polyethylene and nylon polymers are typically supplied in the form of pellets, chips, flakes, and the like. The desired amount of the polyethylene pellets or chips can be blended with the nylon pellets or chips in a suitable mixing device such as a rotary drum tumbler or the like, and the resulting blend can be introduced into the feed hopper of the conventional extruder or the melt blowing line.

Further, differing species of a general polymeric genus can be blended. For example, a high molecular weight styrene material can be blended with a low molecular weight, high impact polystyrene. A Nylon-6 material can be blended with a nylon copolymer such as a Nylon-6; 66; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinyl alcohol materials can be crosslinked using hydroxyl reactive materials such as monoaldehydes, such as formaldehyde, ureas, melamine-formaldehyde resin and its analogues, boric acids and other inorganic compounds, dialdehydes, diacids, urethanes, epoxies and other known crosslinking agents. Crosslinking technology is a well-known and understood phenomenon in which a crosslinking reagent reacts and forms covalent bonds between polymer chains to substantially improve molecular weight, chemical resistance, overall strength and resistance to mechanical degradation.

One preferred mode is a polyamide comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning calorimeter (DSC) analysis reveals a single polymeric material to yield improved stability when contacted with high temperature, high humidity and difficult operating conditions. Preferred materials for use in the blended polymeric systems include nylon 6; nylon 66; nylon 6,10; nylon (6-66-6,10) copolymers and other linear generally aliphatic nylon compositions.

A suitable polyamide may include for example, 20% nylon 6, 60% nylon 66 and 20% by weight of a polyester. The polyamide may include combinations of miscible polymers or combinations of immiscible polymers. In some aspects, the composition is free of aromatic polyamides.

In some aspects, the polyamide may include nylon 6. In terms of lower limits, the polyamide may include nylon 6 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 6 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide may include nylon 66. In terms of lower limits, the polyamide may include nylon 66 in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 66 in an amount of 99.9 wt. % or less, 99 wt. % or less, 95 wt. % or less, 90 wt. % or less, 85 wt. % or less, or 80 wt. % or less. In terms of ranges, the polyamide may comprise nylon 66 in an amount from 0.1 to 99.9 wt. %, e.g., from 1 to 99 wt. %, from 5 to 95 wt. %, from 10 to 90 wt. %, from 15 to 85 wt. %, or from 20 to 80 wt. %.

In some aspects, the polyamide is primarily nylon 66, e.g., at least 50 wt. %, at least 60 wt. %, at least 70 wt. %, at least 80 wt. %, at least 90 wt. %, at least 95 wt. %, or 100 wt. % nylon 66.

In some aspects, the polyamide may include nylon 6I. In terms of lower limits, the polyamide may include nylon 6I in an amount of at least 0.1 wt. %, e.g., at least 0.5 wt. %, at least 1 wt. %, at least 5 wt. %, at least 7.5 wt. %, or at least 10 wt. %. In terms of upper limits, the polyamide may include nylon 6I in an amount of 50 wt. % or less, 40 wt. % or less, 35 wt. % or less, 30 wt. % or less, 25 wt. % or less, or 20 wt. % or less. In terms of ranges, the polyamide may comprise nylon 6I in an amount from 0.1 to 50 wt. %, e.g., from 0.5 to 40 wt. %, from 1 to 35 wt. %, from 5 to 30 wt. %, from 7.5 to 25 wt. %, or from 10 to 20 wt. %.

In some aspects, the polyamide may include nylon 6T. In terms of lower limits, the polyamide may include nylon 6T in an amount of at least 0.1 wt. %, e.g., at least 1 wt. %, at least 5 wt. %, at least 10 wt. %, at least 15 wt. %, or at least 20 wt. %. In terms of upper limits, the polyamide may include nylon 6T in an amount of 50 wt. % or less, 47.5 wt. % or less, 45 wt. % or less, 42.5 wt. % or less, 40 wt. % or less, or 37.5 wt. % or less. In terms of ranges, the polyamide may comprise nylon 6T in an amount from 0.1 to 50 wt. %, e.g., from 1 to 47.5 wt. %, from 5 to 45 wt. %, from 10 to 42.5 wt. %, from 15 to 40 wt. %, or from 20 to 37.5 wt. %.

Block copolymers are also useful in the process of this disclosure. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, are known to be solution spun with relative ease because they are soluble at low pressures and temperatures. It is envisioned these can be melt spun per the instant disclosure as one method of making nanofibers.

There is a substantial advantage to forming polymeric compositions comprising two or more polymeric materials in polymer admixture, alloy format or in a crosslinked chemically bonded structure. Without being bound by theory, it is believed such polymer compositions improve physical properties by changing polymer attributes such as improving polymer chain flexibility or chain mobility, overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material.

The polyamide may have a relative viscosity (RV) of at least 20, e.g., at least 25, at least 30, or at least 35. In terms of upper limits, the polyamide may have an RV of less than 70, e.g., less than 60, less than 55, or less than 50. In terms of ranges, the polyamide may have an RV from 20 to 70, e.g., from 25 to 60, from 30 to 55, or from 35 to 50.

In terms of lower limits, the composition may include polyamide in an amount of at least 40 wt. %, e.g., at least 42.5 wt. %, at least 45 wt. %, at least 47.5 wt. %, at least 50 wt. %, or at least 55 wt. %. In terms of upper limits, the composition may include polyamide in an amount of 70 wt. % or less, 68 wt. % or less, 66 wt. % or less, 64 wt. % or less, 62 wt. % or less, or 60 wt. % or less. In terms of ranges, the composition may include polyamide in an amount from 40 to 70 wt. %, e.g., from 42.5 to 68 wt. %, from 45 to 66 wt. %, from 47.5 to 64 wt. %, from 50 to 62 wt. %, or from 55 to 60 wt. %.

Composition Components

In some embodiments, the non-halogenated flame retardant polyamide composition comprises a polyamide in combination with a non-halogenated flame retardant, a copper-containing heat stabilizer, and optionally one or more additives.

In some embodiments, the non-halogenated flame retardant polyamide composition comprises a polyamide in combination with a non-halogenated flame retardant, a copper-containing heat stabilizer, PA-6 homopolymer, and optionally one or more additives.

In some embodiments, the non-halogenated flame retardant polyamide composition comprises a polyamide in combination with a non-halogenated flame retardant, an amine-containing heat stabilizer, PA-6 homopolymer, and optionally one or more additives.

In some embodiments, the non-halogenated flame retardant polyamide composition comprises a polyamide in combination with a non-halogenated flame retardant, a phenol-containing heat stabilizer, PA-6 homopolymer, and optionally one or more additives.

The composition may be formed by combining the above components and then extruding them through an extruder. It has been found that the compositions described herein are thermally stable and have reduced molecular weight increase during compounding and molding.

As described herein, one major advantage to the composition described herein is that during compounding and molding of the composition, the expected increase in molecular weight is controlled and limited. In some aspects, the initial weight average molecular weight of the polyamide is at least 10,000, e.g., at least 12,500, at least 15,000 or at least 17,500. In terms of upper limits the weight average molecular weight of the initial polyamide is 40,000 or less, e.g., 37,500 or less, 35,000 or less, or 32,500 or less. In terms of ranges, the weight average molecular weight of the initial polyamide is from 10,000 to 40,000, e.g., from 12,500 to 37,500, from 15,000 to 35,000, or from 17,500 to 32,500. In some aspects, the initial number average molecular weight of the polyamide is at least 10,000, e.g., at least 12,500, at least 15,000 or at least 17,500. In terms of upper limits the number average molecular weight of the initial polyamide is 40,000 or less, e.g., 37,500 or less, 35,000 or less, or 32,500 or less. In terms of ranges, the number average molecular weight of the initial polyamide is from 10,000 to 40,000, e.g., from 12,500 to 37,500, from 15,000 to 35,000, or from 17,500 to 32,500. In some aspects, the initial Z-average molecular weight of the polyamide is at least 30,000, e.g., at least 35,000, at least 40,000 or at least 45,000. In terms of upper limits the Z-average molecular weight of the initial polyamide is 70,000 or less, e.g., 65,000 or less, 60,000 or less, or 55,000 or less. In terms of ranges, the Z-average molecular weight of the initial polyamide is from 30,000 to 70,000, e.g., from 35,000 to 65,000, from 40,000 to 60,000, or from 45,000 to 55,000. The polydispersity index of the initial polyamide may be at least 1.2, e.g., at least 1.3, at least 1.4, at least 1.5, or at least 1.6. In terms of upper limits, the polydispersity index of the initial polyamide may be less than 2, e.g., less than 1.95, less than 1.9, less than 1.85, or less than 1.8. In terms of ranges, the polydispersity index of the initial polyamide may be from 1.2 to 2, e.g., from 1.3 to 1.95, from 1.3 to 1.9, from 1.4 to 1.85, from 1.5 to 1.8, or from 1.6 to 1.8. The intrinsic viscosity, in dl/g, of the initial polyamide may be at least 2, e.g., at least 2.1, at least 2.2, at least 2.3, or at least 2.4. In terms of upper limits, the intrinsic viscosity, in dl/g, of the initial polyamide may be less than 3, e.g., less than 2.9, less than 2.8, less than 2.7, or less than 2.6. In terms of ranges, the intrinsic viscosity, in dl/g, of the initial polyamide may be from 2 to 3, e.g., from 2.1 to 2.9, from 2.2 to 2.8, from 2.3 to 2.7, or from 2.4 to 2.6.

After compounding and extrusion or injection molding, the final product may have a weight average molecular weight of at least 20,000, e.g., at least 25,000, at least 30,000 or at least 35,000. In terms of upper limits, the weight average molecular weight of the final product is 100,000 or less, e.g., 97,500 or less, 95,000 or less, or 92,500 or less. In terms of ranges, the weight average molecular weight of the final product is from 20,000 to 100,000, e.g., from 25,000 to 97,500, from 30,000 to 95,000, or from 35,000 to 92,500. In some aspects, the number average molecular weight of the final product is at least 10,000, e.g., at least 12,500, at least 15,000 or at least 17,500. In terms of upper limits the number average molecular weight of the final product is 40,000 or less, e.g., 37,500 or less, 35,000 or less, or 32,500 or less. In terms of ranges, the number average molecular weight of the final product is from 10,000 to 40,000, e.g., from 12,500 to 37,500, from 15,000 to 35,000, or from 17,500 to 32,500. In some aspects, the Z-average molecular weight of the final product is at least 30,000, e.g., at least 35,000, at least 40,000 or at least 45,000. In terms of upper limits the Z-average molecular weight of the final product is 550,000 or less, e.g., 500,000 or less, 400,000 or less, or 300,000 or less. In terms of ranges, the Z-average molecular weight of the final product is from 30,000 to 550,000, e.g., from 35,000 to 500,000, from 40,000 to 400,000, or from 45,000 to 300,000. The polydispersity index of the final product may be at least 1.8, e.g., at least 1.9, at least 2, or at least 2.1. In terms of upper limits, the polydispersity index of the final product may be less than 4, e.g., less than 3.85, less than 3.5, or less than 3. In terms of ranges, the polydispersity index of the final product may be from 1.8 to 4, e.g., from 1.9 to 3.85, from 2 to 3.5, or from 2.1 to 3. The intrinsic viscosity, in dl/g, of the final product may be at least 2, e.g., at least 2.1, at least 2.2, at least 2.3, or at least 2.4. In terms of upper limits, the intrinsic viscosity, in dl/g, of the final product may be less than 4, e.g., less than 3.9, less than 3.8, less than 3.7, or less than 3.6. In terms of ranges, the intrinsic viscosity, in dl/g, of the initial polyamide may be from 2 to 4, e.g., from 2.1 to 3.9, from 2.2 to 3.8, from 2.3 to 3.7, or from 2.4 to 3.6.

In terms of increases, the percent increase in weight average molecular weight from the initial polyamide to the final product may be at least 1%, e.g., at least 5%, at least 10%, or at least 20%. In terms of upper limits, the percent increase in weight average molecular weight from the initial polyamide to the final product may be less than 300%, e.g., less than 250%, less than 200%, or less than 100%. In terms of ranges, the percent increase in weight average molecular weight from the initial polyamide to the final product may be from 1% to 300%, e.g., from 5% to 250%, from 10% to 200%, or from 20% to 100%. In terms of increases, the percent increase in number average molecular weight from the initial polyamide to the final product may be at least 1%, e.g., at least 5%, at least 10%, or at least 15%. In terms of upper limits, the percent increase in number average molecular weight from the initial polyamide to the final product may be less than 100%, e.g., less than 50%, less than 25%, or less than 20%. In terms of ranges, the percent increase in weight average molecular weight from the initial polyamide to the final product may be from 1% to 100%, e.g., from 5% to 50%, from 10% to 25%, or from 15% to 20%. In terms of increases, the percent increase in Z-average molecular weight from the initial polyamide to the final product may be at least 1%, e.g., at least 5%, at least 10%, or at least 20%. In terms of upper limits, the percent increase in Z-average molecular weight from the initial polyamide to the final product may be less than 300%, e.g., less than 250%, less than 200%, or less than 100%. In terms of ranges, the percent increase in Z-average molecular weight from the initial polyamide to the final product may be from 1% to 300%, e.g., from 5% to 250%, from 10% to 200%, or from 20% to 100%. In terms of increases, the percent increase in polydispersity index from the initial polyamide to the final product may be at least 1%, e.g., at least 5%, at least 10%, or at least 20%. In terms of upper limits, the percent increase in polydispersity index from the initial polyamide to the final product may be less than 200%, e.g., less than 100%, less than 50%, or less than 25%. In terms of ranges, the percent increase in polydispersity index from the initial polyamide to the final product may be from 1% to 200%, e.g., from 5% to 100%, from 10% to 50%, or from 20% to 25%. In terms of increases, the percent increase in weight average molecular weight from the initial polyamide to the final product may be at least 1%, e.g., at least 5%, at least 10%, or at least 20%. In terms of upper limits, the percent increase in intrinsic viscosity from the initial polyamide to the final product may be less than 100%, e.g., less than 75%, less than 50%, or less than 25%. In terms of ranges, the percent increase in intrinsic viscosity from the initial polyamide to the final product may be from 1% to 100%, e.g., from 5% to 75%, from 10% to 50%, or from 20% to 25%.

In some embodiments, the non-halogenated flame retardant polyamide composition comprises a polyamide in combination with a non-halogenated flame retardant, a copper-containing heat stabilizer. The polyamide may comprise nylon 66, which may be present in an amount from 40 to 70 wt. % based on the total weight of the composition. The nylon 66 may have a ratio of carboxylic to amine end groups of at least 1.8, e.g., from 1.9 to 3. The flame retardant may be non-halogenated and may be present from 5 to 25 wt. %, based on the total weight of the composition. The copper-containing heat stabilizer may comprise a copper halide and an organohalo-phosphorus compound and may be present in an amount less than 0.29 wt. % based on the total weight of the polyamide composition. In some embodiments, the polyamide composition may include a second copper-containing heat stabilizer and may be present in an amount ranging from 0.01 wt. % to 3 wt. %. In some embodiments, the polyamide composition may include a copper complexing agent that may comprise a phosphorus-containing compound and may be present from 0.1 to 10 wt. %, based on the total weight of the composition.

In some embodiments, the non-halogenated flame retardant polyamide composition comprises a polyamide in combination with a non-halogenated flame retardant, a PA-6 homopolymer, and a copper-containing heat stabilizer. The polyamide may comprise nylon 66, which may be present in an amount from 40 to 70 wt. % based on the total weight of the composition. The nylon 66 may have a ratio of carboxylic to amine end groups of at least 1.8, e.g., from 1.9 to 3. The flame retardant may be non-halogenated and may be present from 5 to 25 wt. %, based on the total weight of the composition. The copper-containing heat stabilizer may comprise a copper halide and an organohalo-phosphorus compound and may be present in an amount less than 0.29 wt. % based on the total weight of the polyamide composition. The PA-6 homopolymer may be present in an amount up to 20 wt. %, based on the total weight of the composition. In some embodiments, the polyamide composition may comprise a second copper-containing heat stabilizer comprising complexed copper and may be present in an amount ranging from 0.01 wt. % to 3 wt. %.

In some embodiments, the non-halogenated flame retardant polyamide composition comprises a polyamide in combination with a non-halogenated flame retardant, a PA-6 homopolymer, and an amine-containing heat stabilizer. The polyamide may comprise nylon 66, which may be present in an amount from 40 to 70 wt. % based on the total weight of the composition. The nylon 66 may have a ratio of carboxylic to amine end groups of at least 1.8, e.g., from 1.9 to 3. The flame retardant may be non-halogenated and may be present from 5 to 25 wt. %, based on the total weight of the composition. The PA-6 homopolymer may be present in an amount up to 20 wt. %, based on the total weight of the composition. The amine-containing heat stabilizer may be present from 0.1 to 2 wt. %, based on the total weight of the composition.

In some embodiments, the non-halogenated flame retardant polyamide composition comprises a polyamide in combination with a non-halogenated flame retardant, a PA-6 homopolymer, and a phenol-containing heat stabilizer. The polyamide may comprise nylon 66, which may be present in an amount from 40 to 70 wt. % based on the total weight of the composition. The nylon 66 may have a ratio of carboxylic to amine end groups of at least 1.8, e.g., from 1.9 to 3. The flame retardant may be non-halogenated and may be present from 5 to 25 wt. %, based on the total weight of the composition. The PA-6 homopolymer may be present in an amount up to 20 wt. %, based on the total weight of the composition. The phenol-containing heat stabilizer may be present from 0.1 to 2 wt. %, based on the total weight of the composition.

Additives

In some aspects, the composition may also include various additives such as fillers, reinforcing agents, stabilizers, additional heat stabilizers, colorants, and the like, with the proviso that the additives do not adversely affect the desired properties of the thermoplastic compositions. Mixtures of additives may be used. Such additives may be mixed at a suitable time during the mixing of the components for forming the polymeric composition. Examples of other suitable additives include flow modifiers, fiberglass, stabilizers, additional heat stabilizers, fillers, and combinations thereof.

In general, the additives may be present in an amount of at least 0.1 wt. %, e.g., at least 0.5 wt. %, at least 1 wt. %, at least 5 wt. %, or at least 10 wt. %. In terms of upper limits, additives may be present in an amount from 55 wt. % or less, from 52.5 wt. % or less, from 50 wt. % or less, from 47.5 wt. % or less, or from 45 wt. % or less. In terms of ranges, additives may be present in an amount from 0.1 to 55 wt. %, e.g., from 0.5 to 52.5 wt. %, from 1 to 50 wt. %, from 5 to 47.5 wt. %, or from 10 to 45 wt. %.

In some aspects, the composition may include fiberglass. The fiberglass may be present in an amount of at least 5 wt. %, e.g., at least 10 wt. %, at least 12.5 wt. %, at least 15 wt. %, at least 20 wt. %, or at least 25 wt. %. In terms of upper limits, the fiberglass may be present in an amount from 45 wt. % or less, from 42.5 wt. % or less, from 40 wt. % or less, from 37.5 wt. % or less, or from 35 wt. % or less. In terms of ranges, the fiberglass may be present in an amount from 5 to 45 wt. %, e.g., from 10 to 42.5 wt. %, from 12.5 to 40 wt. %, from 15 to 37.5 wt. %, from 20 to 35 wt. %, or from 25 to 35 wt. %.

In some embodiments, the composition may include an additive comprising PA-6 homopolymer. The inventors have now discovered that utilizing PA-6 homopolymer (in particular amounts), in combination with the aforementioned heat-stabilizers and polyamides having a high ratio of carboxylic end groups to amine end groups, results in synergistic polyamide compositions that provide for excellent heat aging properties and non-halogen ratings. For example, in some embodiments, this combination of components provides superior heat aging properties for the polyamide composition.

In some aspects, the composition may include PA-6 homopolymer. The PA-6 homopolymer may be present in an amount from 0 to 20 wt. %, e.g., from 0.1 to 19 wt. %, from 0.5 to 18 wt. %, from 1 to 17 wt. %, from 2 to 16 wt. %, from 3 to 15 wt. %, from 4 to 14 wt. %, from 6 to 13 wt. %, from 7 to 12 wt. %, or from 8 to 11 wt. %. In terms of upper limits, the PA-6 homopolymer may be present in an amount from 20 wt. % or less, from 19 wt. % or less, from 18 wt. % or less, from 16 wt. % or less, from 14 wt. % or less, or from 12 wt. % or less. In terms of lower limits, the PA-6 homopolymer may be present in an amount greater than 0 wt. %, e.g., greater than 0.1 wt. %, greater than 0.5 wt. %, greater than 1 wt. %, greater than 2 wt. %, greater than 4 wt. %, greater than 6 wt. %, or greater than 8 wt. %.

Additional fillers or reinforcing agents include any materials known for these uses. For example, suitable fillers and reinforcing agents include silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); single crystal fibers or "whiskers" such as silicon carbide, alumina, boron carbide, iron, nickel, copper, or the like; fibers (including continuous and chopped fibers) such as carbon fibers, glass fibers, such as E glass, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, or the like; as well as additional fillers and reinforcing agents such as mica, feldspar, flue dust, fillite, quartz, quartzite, perlite, tripoli, diatomaceous earth, carbon black, or the like, or combinations comprising at least one of the foregoing fillers or reinforcing agents. In some aspects, the composition is free of aromatic polyamides.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, though, for example, co-weaving or core/sheath, side-by-side or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. In some aspects, the composition is free of a layered silicate. Additionally, in some aspects, the composition is free of ammonium polyphosphate and zinc polyphosphate. In still further aspects, the composition is free of melamine cyanurate and zinc borate.

An antioxidant or "stabilizer" (e.g., a hindered phenol and/or secondary aryl amine) and, optionally, a secondary antioxidant (e.g., a phosphate and/or thioester) may also be included as an additive. Suitable antioxidant additives include, for example, organophosphites such as tris(nonyl phenyl)phosphite, tris(2,4-di-t-butylphenyl)phosphite, bis (2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. In some embodiments, antioxidants and heat stabilizers are used in combination to avoid adverse chemical effects during processing and to provide it with subsequent long-term resistance to exterior effects such as heat, UV light, weathering, and oxygen (air).

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloy)oxy]-2,2-bis[[(2-cyano-3, 3-diphenylacryloy)oxy]methyl]propane (UVINUL™ 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloy) oxy]methyl]propane; nano-size inorganic materials such as titanium oxide, cerium oxide, and zinc oxide, all with particle size less than about 100 nanometers; or the like, or combinations comprising at least one of the foregoing UV absorbers. based on 100 parts by weight of the polymeric components of the polymeric composition.

In some aspects, the fillers include zinc borate and zinc stearate. When included, the fillers may be present in an amount of at least 0.01 wt. %, e.g., at least 0.05 wt. %, at least 0.075 wt. %, or at least 0.1 wt. %. In terms of upper limits, the fillers may be present in an amount from 5 wt. % or less, from 4.75 wt. % or less, from 4.5 wt. % or less, or from 4.25 wt. % or less. In terms of ranges, the fillers may be present in an amount from 0.01 to 5 wt. %, e.g., from 0.05 to 4.75 wt. %, from 0.1 to 4.5 wt. %, or from 0.1 to 4.5 wt. %. In some embodiments, the polyamide composition may comprise one or more of zinc borate and zinc stearate.

In some embodiments, the polyamide composition may comprise zinc borate in an amount of at least 0.01 wt. %, e.g., at least 0.05 wt. %, at least 0.075 wt. %, or at least 0.1 wt. %. In terms of upper limits, zinc borate may be present in an amount from 3 wt. % or less, from 2.75 wt. % or less, from 2.5 wt. % or less, or from 2 wt. % or less. In terms of ranges, zinc borate may be present in an amount from 0.01 to 3 wt. %, e.g., from 0.05 to 2.5 wt. %, from 0.1 to 2 wt. %, or from 0.5 to 1.5 wt. %.

In some embodiments, the polyamide composition may comprise zinc borate in an amount of at least 0.001 wt. %, e.g., at least 0.005 wt. %, at least 0.01 wt. %, or at least 0.05 wt. %. In terms of upper limits, zinc borate may be present in an amount from 2 wt. % or less, from 1.5 wt. % or less, from 1 wt. % or less, or from 0.5 wt. % or less. In terms of ranges, zinc borate may be present in an amount from 0.001 to 2 wt. %, e.g., from 0.005 to 1.5 wt. %, from 0.01 to 1 wt. %, or from 0.05 to 0.5 wt. %.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic non-ionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like.

Colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments.

These additional additives, when present, may be present in an amount of at least 0.01 wt. %, e.g., at least 0.05 wt. %, at least 0.075 wt. %, or at least 0.1 wt. %. In terms of upper limits, the additional additives may be present in an amount from 4 wt. % or less, from 3 wt. % or less, from 2.75 wt. % or less, or from 2.5 wt. % or less. In terms of ranges, the additional additives may be present in an amount from 0.01 to 4 wt. %, e.g., from 0.05 to 3 wt. %, from 0.1 to 2.75 wt. %, or from 0. to 2.5 wt. %.

Performance Characteristics

The non-halogenated flame retardant polyamide compositions described herein demonstrate surprising performance results. For example, the polyamide compositions demonstrate superior tensile strength over broad temperature ranges, e.g., from 190° C. to 230° C. These performance parameters are exemplary and the examples support other performance parameters that are contemplated by the disclosure. For example, other performance characteristics taken at other heat age temperatures and heat age durations are contemplated and may be utilized to characterize the disclosed polyamide compositions. It is contemplated that the molded flame retardant polyamide products produced from the polyamide compositions described herein can have the properties described below.

In some embodiments, the polyamide composition retains 50% of its original tensile strength after heat aging for greater than 800 hours, e.g., greater than 825 hours, greater than 850 hours, greater than 875 hours, greater than 900 hours, greater than 925 hours, greater than 950 hours, greater than 975 hours, or greater than 1000 hours, when heat aged at a temperature of about 195° C., and measured at 23° C. In terms of upper limits, the polyamide composition retains 50% of its original tensile strength after heat aging for less than 1500 hours, e.g., less than 1475 hours, less than 1450 hours, less than 1425 hours, less than 1400 hours, or less than 1375 hours. In terms of ranges, the polyamide composition retains 50% of its original tensile strength after heat aging from 800 hours to 1500 hours, e.g., from 825 hours to 1450 hours, from 875 hours to 1400 hours, from 900 hours to 1375 hours, from 950 hours to 1350 hours, from 1000 hours to 1375 hours, or from 1100 hours to 1400 hours.

In some embodiments, the polyamide composition retains 50% of its original tensile strength after heat aging for greater than 600 hours, e.g., greater than 610 hours, greater than 625 hours, greater than 650 hours, greater than 675 hours, greater than 700 hours, greater than 725 hours, or greater than 750 hours, when heat aged at a temperature of about 205° C., and measured at 23° C. In terms of upper limits, the polyamide composition retains 50% of its original tensile strength after heat aging for less than 1200 hours, e.g., less than 1150 hours, less than 1100 hours, less than 1050 hours, or less than 1025 hours. In terms of ranges, the polyamide composition retains 50% of its original tensile strength after heat aging from 600 hours to 1200 hours, e.g., from 610 hours to 1150 hours, from 625 hours to 1125 hours, from 650 hours to 1100 hours, from 670 hours to 1050 hours, from 700 hours to 1000 hours, or from 725 hours to 975 hours.

In some embodiments, the polyamide composition retains 50% of its original tensile strength after heat aging for greater than 450 hours, e.g., greater than 460 hours, greater than 475 hours, greater than 500 hours, greater than 510 hours, greater than 525 hours, greater than 550 hours, greater than 575 hours, or greater than 600 hours, when heat aged at a temperature of about 215° C., and measured at 23° C. In terms of upper limits, the polyamide composition retains 50% of its original tensile strength after heat aging for less than 1000 hours, e.g., less than 975 hours, less than 950 hours, less than 925 hours, less than 900 hours, or less than 875 hours. In terms of ranges, the polyamide composition retains 50% of its original tensile strength after heat aging from 450 hours to 1000 hours, e.g., from 475 hours to 975 hours, from 500 hours to 950 hours, from 525 hours to 900 hours, from 550 hours to 880 hours, from 575 hours to 850 hours, or from 600 hours to 825 hours.

Such heat age performance over the 190° C. to 230° C. range (as shown throughout this section) illustrates the unexpected performance of the disclosed polyamide compositions. This is applicable to the performance characteristics as well, e.g., tensile strength retention. Other temperature ranges, e.g., from 190° C. to 220° C. or from 210° C. to 230° C., are also supported by the examples and contemplated, but all of these specific performance characteristics are not specifically listed (in the interest of brevity and conciseness).

In some embodiments, the polyamide composition demonstrates a tensile strength retention of at least 75%, e.g., at least 76%, at least 78%, at least 80%, or at least 82%, when heat aged for 1000 hours at a temperature of about 155° C., and measured at 23° C. In terms of upper limits, the tensile strength retention may be less than 99%, less than 98%, less than 95%, less than 92%, less than 90%, less than 88%, less than 86%, or less than 84%. In terms of ranges, the tensile strength retention may range from 75% to 98%, e.g., from 76% to 96%, from 78% to 95%, from 80% to 92%, or from 82% to 90%.

In some embodiments, the polyamide composition demonstrates a tensile strength retention of at least 60%, e.g., at least 62%, at least 64%, at least 66%, or at least 68%, when heat aged for 1000 hours at a temperature of about 165° C., and measured at 23° C. In terms of upper limits, the tensile strength retention may be less than 90%, less than 88%, less than 86%, or less than 84%. In terms of ranges, the tensile strength retention may range from 60% to 90%, e.g., from 62% to 88%, from 65% to 85%, from 68% to 82%, or from 70% to 80%.

In some embodiments, the polyamide composition demonstrates a tensile strength retention of at least 50%, e.g., at least 52%, at least 54%, at least 56%, or at least 60%, when heat aged for 1000 hours at a temperature of about 175° C., and measured at 23° C. In terms of upper limits, the tensile strength retention may be less than 80%, less than 78%, less than less than 76%, less than 74%, or less than 72%. In terms of ranges, the tensile strength retention may range from 50% to 80%, e.g., from 52% to 78%, from 54% to 75%, from 56% to 72%, from 58% to 70%, or from 60% to 68%.

Tensile strength is not the only mechanical property of polyamides that suffers from exposure to high temperatures. The damage to polyamides caused by heat manifests itself in a number of ways. It has been found that the heat-stabilized polyamide compositions also show improved resilience to other forms of damage. That is to say, the polyamide compositions exhibit other desirable mechanical properties after having been exposed to high temperatures.

In some embodiments, the polyamide composition demonstrates a tensile elongation of at least 1.0%, e.g., at least 1.2%, at least 1.4%, at least 1.6%, at least 1.8%, or at least 2%, when measured at room temperature. In terms of upper limits, the tensile elongation may be less than 5%, less than 4.8%, less than 4.6%, less than 4.4%, less than 4.2%, or less than 4.0%. In terms of ranges, the tensile elongation may range from 1.0% to 5.0%, e.g., from 1.5% to 4.5%, from 2% to 4%, or from 2.5% to 3.5%.

Generally, tensile strength and tensile elongation measurements may be conducted under ISO 527-1 (2018 or 2019), and heat aging measurements may be conducted under ISO 188 (2018 or 2019).

Tensile strength retention may be measured by measuring tensile strength before and after treatment and calculating a ratio of the measurements.

Furthermore, the heat stabilizer packages have been shown to retard the damage to the polyamides even when exposed to higher temperature. When tensile strength is measured at higher temperatures, the tensile strength of the heat-stabilized polyamide compositions remains surprisingly high. Typically, the tensile strength of polyamide compositions is much lower when measured at higher temperatures. While that trend remains true of the heat-stabilized polyamide compositions disclosed herein, the actual tensile strength remains surprisingly high even when measured at temperatures.

Method of Forming the Final Molded Product

As described herein, the composition may be compounded and then extruded or injection molded to form a final product. In some aspects, by using a polyamide resin having a ratio of carboxylic acid to amine end groups of greater than 1.8:1, pressure spikes are avoided during extrusion. Additional benefits during extrusion, including control of the increase of molecular weight, are described herein.

Applications

The inventive compositions are useful in a variety of applications due to their thermal stability, flowability, processability, and recyclability. The products may be used in electric and electrical applications, including in connectors, relays, terminal blocks, motors, walls plates, lighting, circuit breakers, switches, and sensors, as well as other applications.

Thus, the products are used in air or liquid filtration in the following sectors: transportation; industrial; commercial and residential.

EXAMPLES

The unique characteristics of the compositions of the disclosure provide functionality and benefits not seen in conventional products, for example, existing non-halogenated flame-retardant compositions and injection-molded articles produced therefrom.

Examples 1-7 were prepared by combining the components in the amounts shown in Table 1 and compounding in a twin-screw extruder. The compositions were melted, additives were added to the melt, and the resultant mixture was extruded and pelletized. In the compositions for Examples 1-7 listed below, the PA-6,6 polyamide had a high carboxylic end group content (a high ratio of carboxylic end groups to amine end groups, e.g., 1.8:1 or greater) as described herein. The non-halogenated flame retardant additive was Exolit® OP1400 (available from Clariant), the fiber glass used was PPG HP 3610 (available from PPG, NL), the amine-antioxidant used was 4,4'-bis($\alpha,\alpha$-dimethyl-benzyl) diphenylamine (Naugard® 445, available from Uniroyal Chemical), the sterically hindered phenolic antioxidant ("Hindered Phenol") used was Irganox® 1098 (available from BASF), and the copper-complex stabilizer used was Bruggolen® H3386 (available from Bruggemann Chemical). The compositions for Comparative Examples A and B comprised a polyamide having a low carboxylic end group content (a low ratio of carboxylic end groups to amine end groups, e.g., less than 1.8:1), and did not utilize at least one of PA6, a copper-complex stabilizer, a sterically hindered phenolic antioxidant, or an amine-antioxidant. All weight percentages (wt. %) are based on the total weight of the polyamide composition.

TABLE 1

|  | High CEG PA-6,6 (wt. %) | PA6 (wt. %) | Fiber Glass (wt. %) | Non-halogen Flame Retardant (wt. %) | Amine-Antioxidant (wt. %) | Hindered Phenol (wt. %) | Copper-Complex Stabilizer (wt. %) | Zinc Borate (wt. %) | Zinc Stearate (wt. %) | Carbon Black (wt. %) |
|---|---|---|---|---|---|---|---|---|---|---|
| Ex. 1 | 52.3 | — | 25 | 20 | — | — | 0.25 | 1 | 0.10 | 1.35 |
| Ex. 2 | 42.3 | 10 | 25 | 20 | — | — | 0.25 | 1 | 0.10 | 1.35 |
| Ex. 3 | 50.8 | — | 25 | 20 | 1 | — | — | 1 | 0.10 | 2.10 |
| Ex. 4 | 41.8 | 10 | 25 | 20 | 0.5 | — | — | 1 | 0.10 | 1.60 |
| Ex. 5 | 40.8 | 10 | 25 | 20 | 1 | — | — | 1 | 0.10 | 2.10 |
| Ex. 6 | 41.8 | 10 | 25 | 20 | — | 0.5 | — | 1 | 0.10 | 1.60 |
| Ex. 7 | 40.8 | 10 | 25 | 20 | — | 1 | — | 1 | 0.10 | 2.10 |

Examples 1-7 and Comparative Examples A and B were heat aged and tested for tensile strength, tensile strength retention, and tensile elongation. The samples were heat-aged at the temperatures listed in Table 2 and the heat age time (hours) to reach 50% tensile strength from the original tensile strength was measured. The tensile strength measurements were conducted under ISO 527-1 (2018 or 2019), and heat aging measurements were conducted under ISO 188 (2018 or 2019). The results are summarized in Tables 2-4.

TABLE 2

| | Heat Age Time (hours) to 50% Tensile Strength | | |
|---|---|---|---|
| | 195° C. | 205° C. | 215° C. |
| Comp. A | 825 | 600 | 500 |
| Comp. B | 875 | 600 | 300 |
| Ex. 1 (Bound Cu) | 1225 | 750 | 475 |
| Ex. 2 (PA6/B—Cu) | 1100 | 910 | 880 |
| Ex. 3 (2K) | 850 | 600 | 475 |
| Ex. 4 (PA6/K) | 1100 | 665 | 600 |
| Ex. 5 (PA6/2K) | 1375 | 1025 | 800 |
| Ex. 6 (PA6/J) | 975 | 610 | 475 |
| Ex. 7 (PA6/2J) | 1100 | 875 | 530 |

As shown in Table 2, Examples 1-7 generally demonstrated significant improvements in heat age performance over the temperature range of 195° C.-215° C. Also, the improvements in heat age performance are even more significant as the heat age temperature increases. The tensile strength over the temperature range and these extended heat age times are important and significant because they represent conditions under which polyamide compositions polyamide compositions are typically employed, e.g., automotive under-the-hood applications.

A majority of the average values and ranges for the working Examples are higher than the values for the respective Comparative Examples, especially at higher heat-age times. For example, for tensile strength measured at 195° C., the range for the heat-aging time to reach 50% tensile strength (from the original tensile strength) for the working Examples was 975-1375 hours (excluding Example 3), while the range for the Comparative Examples was significantly less, 825-875 hours. The comparison is even more stark at 205° C. and 215° C. for Examples 2, 4, 5, and 7. The range for the heat-age time to 50% tensile strength for the working Examples 2, 4, 5, and 7 was 530-1375 hours, while the range for the Comparative Examples was significantly less, 380-600 hours. Again, this demonstrates the improvements in performance in the temperature gap and at higher heat-age times.

The samples were heat-aged for 1000 hours at the temperatures listed in Table 3 and tested for tensile strength retention. The tensile strength retention was measured by measuring tensile strength before and after treatment and calculating a ratio of the measurements. The tensile strength retention results are summarized in Table 3.

TABLE 3

| | Tensile Strength (% Retention) | | |
|---|---|---|---|
| | 155° C. | 165° C. | 175° C. |
| Comp. A | 77 | — | 62 |
| Comp. B | 73 | — | 67 |
| Ex. 1 (Bound Cu) | 96 | 66 | 69 |
| Ex. 2 (PA6/B—Cu) | 78 | 73 | 63 |
| Ex. 3 (2K) | — | 64 | 53 |
| Ex. 4 (PA6/K) | — | 69 | 58 |
| Ex. 5 (PA6/2K) | 83 | 76 | 72 |
| Ex. 6 (PA6/J) | — | 69 | 55 |
| Ex. 7 (PA6/2J) | 77 | 76 | 69 |

Examples 1-7 provide an improved polyamide compound that demonstrates significant improvements in tensile strength retention at higher temperature ranges, e.g., above 155° C. or from 155° C. to 175° C., which is where many polyamide structures are utilized, for example in automotive applications that deal with engine heat. Examples 1, 2, 5 and 7 had a tensile strength retention after heat aging for 1000 hours at 155° C. ranging from 77% to 96%, whereas Comparative Examples A and B had a tensile strength retention of 77% or less. Specifically, Example 5 had a tensile strength retention of 83% after heat aging for 1000 hours at 155° C., a tensile strength retention of 76% after heat aging for 1000 hours at 165° C., and a tensile strength retention of 72% after heat aging for 1000 hours at 175° C. Example 5 exhibited the highest tensile strength retention at a heat-aging temperature of 175° C.

Specifically, Examples 2 and 5, which included PA6 homopolymer, demonstrated a high tensile strength retention over the temperature range from 155° C.-175° C. The polyamide compositions including PA6 homopolymer demonstrated enhanced thermal stability (e.g., tensile strength retention). Additionally, the polyamide compositions including amine antioxidant (Examples 3-5) and sterically hindered phenolic antioxidant (Examples 6 and 7) also demonstrated enhanced thermal stability over the aforementioned range.

The tensile elongation results are summarized in Table 4. The tensile elongation measurements were conducted under ISO 527-1 (2018 or 2019), and heat aging measurements were conducted under ISO 188 (2018 or 2019).

TABLE 4

|  | Tensile Elongation (%) |
| --- | --- |
| Comp. A | 2.5 |
| Comp. B | 2.8 |
| Ex. 1 (Bound Cu) | 2.6 |
| Ex. 2 (PA6/B—Cu) | 3.2 |
| Ex. 3 (2K) | 2.5 |
| Ex. 4 (PA6/K) | 3.2 |
| Ex. 5 (PA6/2K) | 3.1 |
| Ex. 6 (PA6/J) | 2.8 |
| Ex. 7 (PA6/2J) | 2.7 |

As shown in Table 4, Examples 1-7 generally demonstrated improvements in tensile elongation at high heat-aging temperatures. For example, Examples 2 and 4 each had a tensile elongation of 3.2%, whereas Comparative Example A had a tensile elongation of 2.5%. Once again, the polyamide compositions including PA6 homopolymer generally demonstrated enhanced elongation at break.

As shown in the Tables, Examples 1-7, which employed the aforementioned polyamide and additives, generally demonstrated unexpected, synergistic results in for all of the measured performance characteristics (e.g., tensile strength, tensile retention, and tensile elongation). Importantly, the disclosed polyamide compositions show significant improvements over the temperature range of 195° C.-215° C. The tensile strength/retention over the temperature range and these extended heat age times are important and significant because they represent conditions under which polyamide compositions are typically employed, e.g., automotive under-the-hood applications.

Individual comparisons also support the showing of the synergies of the disclosed formulations. As one example, the comparison of Example 2 and Comparative Examples A and B demonstrate the surprising, synergistic effect of the disclosed stabilizer package and polyamide. Comparative Example A utilized a polyamide having a low carboxylic end group content (a low ratio of carboxylic end groups to amine end groups, e.g., less than 1.8:1), and did not include at least one of PA6, a copper-complex stabilizer, a sterically hindered phenolic antioxidant, or an amine-antioxidant, while Example 2 utilized a high CEG polyamide and a copper-complex heat stabilizer. At 215° C., the heat-age time for 50% tensile strength for Comparative Examples A and B was 500 hours and 300 hours, respectively. Surprisingly, Example 5 demonstrated a heat-age time for 50% tensile strength of 800 hours under the same test conditions. Additionally, the tensile elongation for Example 2 was at least 12% greater than Comparatives A and B. The magnitude of these improvements is unexpected.

By incorporating the heat stabilizer packages and polyamides disclosed herein, the inventors have found that the performance of polyamide compositions can be improved, e.g., at higher temperatures, and that damage typically suffered by polyamide compositions at higher temperatures, e.g., thermo-oxidative damage, is mitigated. These heat stabilizer packages thus allow for the improved use and functionality of polyamide compositions in environments of higher temperature, e.g., in automotive applications. In contrast, polyamide compositions already known in the art become much more brittle after being exposed to such high temperatures, the compositions disclosed herein are able to maintain a higher strength and elongation.

EMBODIMENTS

Embodiment 1

A flame retardant polyamide composition comprising: a polyamide having a ratio of carboxylic acid end groups to amine end groups of greater than 1.8:1; a non-halogenated flame retardant; less than 0.29 wt. % of a copper-containing heat stabilizer comprising a copper halide and an organo-halo-phosphorus compound, based on the total weight of the polyamide composition; wherein the polyamide composition comprises less than 900 ppm of bromine.

Embodiment 2

An embodiment according to embodiment 1, wherein the polyamide composition further comprises a PA-6 homopolymer.

Embodiment 3

An embodiment according to embodiments 1 or 2, wherein the PA-6 homopolymer is present up to 20 wt. %, based on the total weight of the polyamide composition.

Embodiment 4

An embodiment according to embodiments 1-3, wherein the polyamide composition comprises less than 900 ppm of chlorine.

Embodiment 5

An embodiment according to embodiments 1-4, wherein the polyamide composition comprises less than 1500 ppm of chlorine and bromine in combination.

Embodiment 6

An embodiment according to embodiments 1-5, wherein the polyamide composition further comprises a second copper-containing heat stabilizer comprising free copper; and a copper complexing agent comprising a phosphorus-containing additive.

Embodiment 7

An embodiment according to embodiments 1-6, wherein the phosphorus-containing additive complexes the free copper of the second copper-containing heat stabilizer.

Embodiment 8

An embodiment according to embodiments 1-7, wherein the phosphorus-containing additive comprises a phosphine-containing compound, a phosphate-containing compound, a polyphosphate-containing compound, a bromine-containing phosphate, a bromine-containing polyphosphate, a bromine-containing phosphite, a chlorine-containing phosphate, a chlorine-containing polyphosphonate, a chlorine-containing phosphite, triphenylphosphine, triphenylphosphite or combinations thereof.

Embodiment 9

An embodiment according to embodiments 1-8, wherein the second copper-containing heat stabilizer comprises copper halides, copper acetate, copper propionate, copper benzoate, copper adipate, copper terephthalate, copper isophthalate, copper salicylate, copper nicotinate, copper stearate, copper complex salts, or combinations thereof.

Embodiment 10

An embodiment according to embodiments 1-9, wherein the second copper-containing heat stabilizer is present in an amount less than 3 wt. %, based on the total weight of the polyamide composition.

Embodiment 11

An embodiment according to embodiments 1-10, wherein the polyamide composition further comprises an amine-containing heat stabilizer, a phenol-containing heat stabilizer, or combinations thereof.

Embodiment 12

An embodiment according to embodiments 1-11, wherein the polyamide composition comprises less than 5 wt. % of elemental phosphorus, based on the total weight of the polyamide composition.

Embodiment 13

An embodiment according to embodiments 1-12, wherein the polyamide composition further comprises one or more additives comprising a flow modifier, fiberglass, a filler, a synergist, a lubricant/mold-release agent, antioxidants, or combinations thereof.

Embodiment 14

An embodiment according to embodiments 1-13, wherein the polyamide composition comprises 40 wt. % to 70 wt. % of the polyamide; 5 wt. % to 25 wt. % of the non-halogen flame retardant; 0.1 wt. % to 3 wt. % of the second copper-containing heat stabilizer; 0.1 wt. % to 15 wt. % of a copper complexing agent; and 0 wt. % to 10 wt. % of a lubricant/mold release agent.

Embodiment 15

An embodiment according to embodiments 1-14, wherein the non-halogenated flame retardant comprises an organic phosphorus flame retardant.

Embodiment 16

A flame retardant polyamide composition comprising: a polyamide having a ratio of carboxylic acid end groups to amine end groups of greater than 1.8:1; a non-halogenated flame retardant; a PA-6 homopolymer; less than 0.29 wt. % of a first copper-containing heat stabilizer comprising a copper halide and an organohalo-phosphorus compound, based on the total weight of the polyamide composition; and wherein the polyamide composition comprises less than 900 ppm of bromine.

Embodiment 17 a flame retardant polyamide composition comprising: a polyamide having a ratio of carboxylic acid end groups to amine end groups of greater than 1.8:1; a non-halogenated flame retardant; a PA-6 homopolymer; and an amine-containing heat stabilizer.

Embodiment 18

An embodiment of embodiment 17, wherein the PA-6 homopolymer is present up to 20 wt. %, based on the total weight of the polyamide composition.

Embodiment 19

An embodiment of embodiments 17 or 18, wherein the amine-containing heat-stabilizer comprise hindered amine-based heat stabilizers.

Embodiment 20

An embodiment of embodiments 17-19, wherein the composition further comprises one or more additives comprising a flow modifier, fiberglass, a filler, a synergist, a lubricant/mold-release agent, antioxidants, or combinations thereof.

Embodiment 21

An embodiment of embodiments 17-20, wherein the non-halogenated flame retardant comprises an organic phosphorus flame retardant.

Embodiment 22

A flame retardant polyamide composition comprising: a polyamide having a ratio of carboxylic acid end groups to amine end groups of greater than 1.8:1; a non-halogenated flame retardant; a PA-6 homopolymer; and a phenol-containing heat stabilizer.

Embodiment 23

An embodiment of embodiment 22, wherein the PA-6 homopolymer is present up to 20 wt. %, based on the total weight of the polyamide composition.

Embodiment 24

An embodiment of embodiments 22 or 23, wherein the phenol-containing heat stabilizer comprises N,N'-hexane-1, 6-diylbis[3-(3,5-di-tert-butyl-4-hydroxyphenylpropionamide)]; pentaerythrityl-tetrakis[3-(3,5-di-tert-butyl-4-hydroxyphenyl)propionate]; N,N'-hexamethylenebis(3,5-di-tert-butyl-4-hydroxy-hydrocinnamamide); triethyleneglycol-bis[3-(3-tert-butyl-5-methyl-4-hydroxyphenyl)propionate]; 3,9-bis {2-[3-(3-tert-butyl-4-hydroxy-5-methylphenyl)propionyloxy]-1,1-dimethylethyl}-2,4,8,10-tetraoxaspiro[5,5]undecane; 3,5-di-tert-butyl-4-hydroxybenzylphosphonate-diethyl ester; 1,3,5-trimethyl-2,4,6-tris(3,5-ditert-butyl-4-hydroxybenzyl)benzene; and 1,3,5-tris(4-tert-butyl-3-hydroxy-2,6-dimethylbenzyl)isocyanurate, or combinations thereof.

Embodiment 25

An embodiment of embodiments 22-24, wherein the polyamide composition further comprises one or more additives comprising a flow modifier, fiberglass, a filler, a synergist, a lubricant/mold-release agent, antioxidants, or combinations thereof.

Embodiment 26

An embodiment of embodiments 22-25, wherein the non-halogenated flame retardant comprises an organic phosphorus flame retardant.

Embodiment 27

An embodiment of embodiments 1-26, wherein a molded flame retardant polyamide product is produced from any one of the polyamide compositions described herein.

While the disclosure has been described in detail, modifications within the spirit and scope of the disclosure will be readily apparent to those of skill in the art. Such modifications are also to be considered as part of the present disclosure. In view of the foregoing discussion, relevant knowledge in the art and references discussed above in connection with the Background, the disclosures of which are all incorporated herein by reference, further description is deemed unnecessary. In addition, it should be understood from the foregoing discussion that aspects of the disclosure and portions of various embodiments may be combined or interchanged either in whole or in part. Furthermore, those of ordinary skill in the art will appreciate that the foregoing description is by way of example only, and is not intended to limit the disclosure. Finally, all patents, publications, and applications referenced herein are incorporated by reference in their entireties.

What is claimed is:

1. A flame retardant polyamide composition comprising:
   polyamides consisting of polyamide 6,6 having a ratio of carboxylic acid end groups to amine end groups of greater than 1.8:1 and a PA-6 homopolymer, wherein the PA-6 homopolymer is present up to 20 wt. %, based on the total weight of the polyamide composition;
   a non-halogenated flame retardant;
   less than 0.29 wt. % of a first copper-containing heat stabilizer, wherein the first copper-containing heat stabilizer comprises a copper halide and an organohalophosphorus compound, based on the total weight of the polyamide composition;
   wherein the polyamide composition comprises less than 900 ppm of bromine, and
   wherein the polyamide composition retains 50% of its original tensile strength after heat aging for greater than 800 hours when heat aged at a temperature of 195° C. and measured at 23° C.

2. The flame retardant polyamide composition according to claim 1, wherein the polyamide composition comprises less than 900 ppm of chlorine.

3. The flame retardant polyamide composition according to claim 1, wherein the polyamide composition comprises less than 1500 ppm of chlorine and bromine in combination.

4. The flame retardant polyamide composition according to claim 1, further comprising:
   a second copper-containing heat stabilizer comprising free copper; and
   a copper complexing agent comprising a phosphorus-containing additive.

5. The flame retardant polyamide composition according to claim 4, wherein the copper complexing agent complexes the free copper of the second copper-containing heat stabilizer.

6. The flame retardant polyamide composition according to claim 4, wherein the phosphorus-containing additive comprises a phosphine-containing compound, a phosphate-containing compound, a polyphosphate-containing compound, a bromine-containing phosphate, a bromine-containing polyphosphate, a bromine-containing phosphite, a chlorine-containing phosphate, a chlorine-containing polyphosphonate, a chlorine-containing phosphite, triphenylphosphine, triphenylphosphite or combinations thereof.

7. The flame retardant polyamide composition according to claim 4, wherein the second copper-containing heat stabilizer comprises copper halides, copper acetate, copper propionate, copper benzoate, copper adipate, copper terephthalate, copper isophthalate, copper salicylate, copper nicotinate, copper stearate, copper complex salts, or combinations thereof.

8. The flame retardant polyamide composition according to claim 4, wherein the second copper-containing heat stabilizer is present in an amount less than 3 wt. %, based on the total weight of the polyamide composition.

9. The flame retardant polyamide composition according to claim 1, further comprises an amine-containing heat stabilizer, a phenol-containing heat stabilizer, or combinations thereof.

10. The flame retardant polyamide composition according to claim 1, wherein the polyamide composition comprises less than 5 wt. % of elemental phosphorus, based on the total weight of the polyamide composition.

11. The flame retardant polyamide composition according to claim 1, wherein the polyamide composition comprises from 0.1 wt. % to 20 wt. % of PA6, wherein the polyamide composition has a tensile elongation of at least 1.0%, and wherein the polyamide composition has a tensile strength retention of at least 75% when heat aged for 1000 hours at a temperature of 155° C. and measured at 23° C.

12. The flame retardant polyamide composition according to claim 1 comprising:
   40 wt. % to 70 wt. % of the polyamide 6,6;
   5 wt. % to 25 wt. % of the non-halogen flame retardant;
   0 wt. % to 30 wt. % of fiberglass;
   0 wt. % to 3 wt. % of carbon black; and
   0 wt. % to 5 wt. % of zinc stearate and/or zinc borate.

13. A flame retardant polyamide composition comprising:
   polyamides consisting of polyamide 6,6 having a ratio of carboxylic acid end groups to amine end groups of greater than 1.8:1 and a PA-6 homopolymer, wherein the PA-6 homopolymer is present up to 20 wt. %, based on the total weight of the polyamide composition;
   a non-halogenated flame retardant comprising an organic phosphorus flame retardant; and
   an amine-containing heat stabilizer,
   wherein the polyamide composition retains 50% of its original tensile strength after heat aging for greater than 450 hours when heat aged at a temperature of 215° C. and measured at 23° C.

14. The flame retardant polyamide composition according to claim 13, wherein the polyamide composition has a tensile elongation of at least 3.0%.

15. The flame retardant polyamide composition according to claim 13, wherein the amine-containing heat stabilizer comprise hindered amine-based heat stabilizers.

16. A flame retardant polyamide composition comprising:
polyamides consisting of polyamide having a ratio of carboxylic acid end groups to amine end groups of greater than 1.8:1 and a PA-6 homopolymer, wherein the PA-6 homopolymer is present up to 20 wt. %, based on the total weight of the polyamide composition;
a non-halogenated flame retardant comprising an organic phosphorus flame retardant;
and
a phenol-containing heat stabilizer,
wherein the polyamide composition retains 50% of its original tensile strength after heat aging for greater than 450 hours when heat aged at a temperature of 215° C. and measured at 23° C., and wherein the polyamide composition has a tensile elongation of at least 2.5%.

17. The flame retardant polyamide composition according to claim 16, wherein the phenol-containing heat stabilizer comprises N, N'-hexane-1,6-diylbis[3-(3,5-di-tert-butyl-4-hydroxyphenylpropionamide)]; pentaerythrityl-tetrakis[3-(3,5-di-tert-butyl-4-hydroxyphenyl)propionate]; N,N'-hexamethylenebis(3,5-di-tert-butyl-4-hydroxy-hydrocinnamamide); triethyleneglycol-bis[3-(3-tert-butyl-5-methyl-4-hydroxyphenyl)propionate]; 3,9-bis{2-[3-(3-tert-butyl-4-hydroxy-5-methylphenyl)propionyloxy]-1, 1-dimethylethyl}-2,4,8, 10-tetraoxaspiro[5,5]undecane; 3,5-di-tert-butyl-4-hydroxybenzylphosphonate-diethyl ester; 1,3,5-trimethyl-2,4,6-tris(3,5-di-tert-butyl-4-hydroxybenzyl) benzene; and 1,3,5-tris(4-tert-butyl-3-hydroxy-2,6-dimethylbenzyl)isocyanurate, or combinations thereof.

18. The flame retardant polyamide composition according to claim 16, wherein the composition further comprises one or more additives comprising a flow modifier, fiberglass, a filler, a synergist, a lubricant/mold-release agent, antioxidants, or combinations thereof.

* * * * *